US012761407B2

(12) United States Patent
Tanaka et al.

(10) Patent No.: US 12,761,407 B2
(45) Date of Patent: Oct. 13, 2026

(54) OPTICAL LAMINATE AND OPTICAL DEVICE

(71) Applicant: NITTO DENKO CORPORATION, Osaka (JP)

(72) Inventors: Akiko Tanaka, Osaka (JP); Mizuho Mizuno, Osaka (JP); Kozo Nakamura, Osaka (JP); Yufeng Weng, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 343 days.

(21) Appl. No.: 18/270,045

(22) PCT Filed: Feb. 4, 2022

(86) PCT No.: PCT/JP2022/004555
§ 371 (c)(1),
(2) Date: Jun. 28, 2023

(87) PCT Pub. No.: WO2022/176659
PCT Pub. Date: Aug. 25, 2022

(65) Prior Publication Data

US 2024/0061157 A1 Feb. 22, 2024

(30) Foreign Application Priority Data

Feb. 19, 2021 (JP) ................................ 2021-025496
Jun. 22, 2021 (JP) ................................ 2021-103317

(51) Int. Cl.
*G02B 5/02* (2006.01)
*C09J 11/06* (2006.01)
(Continued)

(52) U.S. Cl.
CPC ............. *G02B 5/0231* (2013.01); *C09J 11/06* (2013.01); *C09J 133/08* (2013.01); *C09J 133/14* (2013.01);
(Continued)

(58) Field of Classification Search
None
See application file for complete search history.

(56) References Cited

U.S. PATENT DOCUMENTS

2013/0003389 A1 1/2013 Moroishi et al.
2013/0063955 A1 3/2013 Rinko
(Continued)

FOREIGN PATENT DOCUMENTS

JP 2009-122160 6/2009
JP 2010-49820 3/2010
(Continued)

OTHER PUBLICATIONS

International Search Report issued in International Patent Application No. PCT/JP2022/004555, dated Apr. 26, 2022.
(Continued)

*Primary Examiner* — Phu Vu
(74) *Attorney, Agent, or Firm* — Greenblum & Bernstein, P.L.C.

(57) ABSTRACT

An optical stack includes: a first optical sheet having a first principal face with a concavo-convex structure and a second principal face at an opposite side from the first principal face; and an adhesive layer that is disposed on the first principal face of the first optical sheet. The concavo-convex structure includes a plurality of dents and flat portions between adjacent ones of the plurality of dents. A surface of the adhesive layer and the first principal face of the first optical sheet together define an internal space within each of the plurality of dents. Each of the plurality of dents satisfies $0.10 \leq (C-A)/C \leq 1.00$ and $0.75 \leq (C-A)/(C-B)$, where A is a maximum height value of the adhesive layer existing in that dent; B is a minimum height value of the adhesive layer existing in that dent; and C is a depth of that dent.

11 Claims, 9 Drawing Sheets

(51) Int. Cl.
*C09J 133/08* (2006.01)
*C09J 133/14* (2006.01)
*C09J 167/00* (2006.01)

(52) U.S. Cl.
CPC ....... *C09J 167/00* (2013.01); *C09J 2301/312* (2020.08)

(56) References Cited

U.S. PATENT DOCUMENTS

| | | | | |
|---|---|---|---|---|
| 2018/0074234 | A1 | 3/2018 | Chen et al. | |
| 2019/0243035 | A1 | 8/2019 | Chen et al. | |
| 2019/0353838 | A1* | 11/2019 | Heber | G02B 6/0036 |
| 2020/0257044 | A1 | 8/2020 | Rinko | |
| 2020/0386921 | A1 | 12/2020 | Matsubara | |
| 2023/0102613 | A1 | 3/2023 | Mizuno et al. | |
| 2023/0110868 | A1 | 4/2023 | Mizuno et al. | |

FOREIGN PATENT DOCUMENTS

| | | | |
|---|---|---|---|
| JP | 2011-26361 | 2/2011 | |
| JP | 2017-61676 | 3/2017 | |
| JP | 2018-4956 | 11/2018 | |
| JP | 2019003099 A * | 1/2019 | H10K 59/8722 |
| JP | 2019-178283 | 10/2019 | |
| JP | 2012-7046 | 1/2021 | |
| WO | 2011/124765 | 10/2011 | |
| WO | 2018/174198 | 9/2018 | |
| WO | 2019/087118 | 5/2019 | |
| WO | 2021/167090 | 8/2021 | |
| WO | 2021/167091 | 8/2021 | |

OTHER PUBLICATIONS

Written Opinion issued in International Patent Application No. PCT/JP2022/004555, dated Apr. 26, 2022.

Extended European Search Report issued in EP Application No. 22755980.4, dated Dec. 4, 2024.

Taiwanese Office Action and Search Report received in Application No. 111106040, dated Sep. 15, 2025, with English language translations.

China, Office Action issued in CN Application No. 20228008729.6 dated May 9, 2026, and English translation thereof.

* cited by examiner

OPTICAL LAMINATE AND OPTICAL DEVICE

TECHNICAL FIELD

The present invention relates to an optical stack and an optical device having such an optical stack.

BACKGROUND ART

Optical sheets (e.g., microlens sheets, prism sheets, brightness enhancement films (e.g., Brightness Enhancement Film: BEF (registered trademark) manufactured by 3M) are used in various optical devices (e.g., display devices and illumination devices). In the present specification, "optical sheet" is not limited to those illustrated above, but broadly includes sheet-shaped optical components, and further includes, for example, diffusion plates and light guide plates. An optical device is attached to another optical sheet or an optical device by using an adhesive layer, for example. In the present specification, "optical stack" refers to a configuration including an optical sheet and an adhesive layer or including a plurality of optical sheets. In the present specification, "adhesive" is meant to encompass tackiness agents (also referred to as "pressure-sensitive adhesives").

The applicant has disclosed an optical stack (referred to as "optical sheet" in Patent Document 1) that can be used for display devices and illumination devices in Patent Document 1. The optical stack in Patent Document 1 has an optical sheet (e.g., microlens sheet) having a concavo-convex structure on its surface and an adhesive layer provided on the surface having the concavo-convex structure. The adhesive layer fills 5% to 90% of the convex height of the concavo-convex structure. The adhesive layer is formed from an adhesive composition containing a graft polymer, which is a (meth)acrylic polymer grafted with chains containing monomers containing cyclic ether groups, and a cationic photopolymerization initiator or heat-curing catalyst.

Moreover, Patent Documents 2 and 3 disclose light distribution structures that may be used for display devices or illumination devices, in which total reflection at interfaces of multiple air cavities is utilized. With the light distribution structures disclosed in Patent Documents 2 and 3, freedom and accuracy of light distribution control can be improved. The entire disclosure of Patent Documents 2 and 3 is incorporated herein by reference.

CITATION LIST

Patent Literature

[Patent Document 1] Japanese Laid-Open Patent Publication No. 2012-007046

[Patent Document 2] International Publication No. 2011/124765

[Patent Document 3] International Publication No. 2019/087118

SUMMARY OF INVENTION

Technical Problem

When attaching an adhesive layer onto a surface of an optical sheet having a concavo-convex structure, the degree to which the adhesive layer penetrates into (fills in) the dents of the concavo-convex structure affects the functionality of the optical sheet. Therefore, it is desired to reduce the degree to which the adhesive layer penetrates into the dents of the concavo-convex structure (i.e., a ratio of the volume of any adhesive layer existing in spaces that are defined by the dents of the concavo-convex structure to the volume of such spaces).

The inventors have also considered utilizing a surface of the optical sheet having a concavo-convex structure and a surface of the adhesive layer that is attached to the surface of the optical sheet featuring the concavo-convex structure to create multiple air cavities (internal space) that constitute light distribution structures (light distribution control structures) as described in Patent Documents 2 and 3. Patent Documents 2 and 3 do not describe multiple air cavities (internal space) to constitute a light distribution structure being created by a surface of the optical sheet having a concavo-convex structure and a surface of the adhesive layer. Neither is there any discussion of a relationship between the degree to which the adhesive layer penetrates into the dents of the concavo-convex structure and the influences on light distribution control.

The present invention has been made in order to solve the aforementioned problems, and an objective thereof is to provide an optical stack having an adhesive layer such that the degree to which the adhesive layer penetrates into dents of a concavo-convex structure of an optical sheet is reduced, and an optical device having such an optical stack.

Solution to Problem

According to embodiments of the present invention, means for solution as recited in the following Items are provided.

[Item 1]

An optical stack comprising:

- a first optical sheet having a first principal face with a concavo-convex structure and a second principal face at an opposite side from the first principal face; and
- an adhesive layer that is disposed on the first principal face of the first optical sheet, wherein,
- the concavo-convex structure includes a plurality of dents and flat portions between adjacent ones of the plurality of dents;
- the adhesive layer is in contact with the flat portions;
- a surface of the adhesive layer and the first principal face of the first optical sheet together define an internal space within each of the plurality of dents; and
- each of the plurality of dents satisfies $0.10 \leq (C-A)/C \leq 1.00$ and $0.75 \leq (C-A)/(C-B)$, where A is a maximum height value of the adhesive layer existing in that dent; B is a minimum height value of the adhesive layer existing in that dent; and C is a depth of that dent.

[Item 2]

The optical stack of Item 1, wherein a thickness of the adhesive layer above the flat portions is not less than 0.01 μm and not more than 15.0 μm.

[Item 3]

The optical stack of Item 1 or 2, wherein, in a plan view in which the first optical sheet is viewed from a normal direction of the first principal face, a ratio of an area of the plurality of dents to an area of the first optical sheet is not less than 0.3% and not more than 80%.

[Item 4]

The optical stack of any one of Items 1 to 3, wherein the plurality of dents have a cross-section which is a triangle, a rectangle, or a shape that at least partially contains a curve.

[Item 5]

The optical stack of any one of Items 1 to 4, having a haze value of 5.0% or less.

[Item 6]

The optical stack of any one of Items 1 to 5, wherein the adhesive layer is any one of adhesive layers Aa, Ab and Ac as follows:

an adhesive layer Aa, having a creep deformation rate of 10% or less when a stress of 10000 Pa is applied for 1 second at 50° C. and a creep deformation rate of 16% or less when a stress of 10000 Pa is applied for 30 minutes at 50° C. in a creep test using a rotational rheometer, the adhesive layer Aa having a 180° peel adhesive strength of 10 mN/20 mm or more with respect to a PMMA film;

an adhesive layer Ab, being formed by curing a curable resin in an adhesive composition that includes a polymer and the curable resin, the adhesive layer Ab having a 23° C. initial tensile modulus of elasticity of not less than 0.35 MPa and not more than 8.00 MPa before curing the curable resin in the adhesive composition and having a 23° C. initial tensile modulus of elasticity of 1.00 MPa or more after curing the curable resin in the adhesive composition; and an adhesive layer Ac, being formed by cross-linking an adhesive composition containing: a polyester resin that is a copolymer of a polycarboxylic acid and a polyalcohol; a cross-linking agent; and at least one cross-linking catalyst selected from the group consisting of an organic zirconium compound, organic iron compound, and an organic aluminum compound, the adhesive layer Ac having a gel fraction of 40% or more after being maintained at a temperature of 85° C. and a relative humidity of 85% for 300 hours and having a 180° peel adhesive strength of 100 mN/20 mm or more with respect to a PMMA film.

[Item 7]

The optical stack of any one of Items 1 to 6, wherein the adhesive layer contains at least one of polymers (1) to (3) as follows:

(1) a copolymer of a nitrogen-containing (meth)acrylic monomer and at least one other kind of monomer;

(2) a copolymer of a carboxyl group-containing acrylic monomer and at least one other kind of monomer (except for nitrogen-containing (meth)acrylic monomers); and (3) a polyester-based polymer.

[Item 8]

The optical stack of any one of Items 1 to 7, further comprising a second optical sheet provided at an opposite side of the adhesive layer from the first optical sheet.

[Item 9]

The optical stack of any one of Items 1 to 8, wherein, each of the plurality of dents includes a first slope to direct a portion of light propagating in the adhesive layer toward the second principal face of the first optical sheet via total internal reflection, and a second slope at an opposite side from the first slope; and in each of the plurality of dents, a height of the adhesive layer above the first slope of that dent is the maximum height value of the adhesive layer existing in that dent.

[Item 10]

The optical stack of Item 9, wherein an inclination angle $\theta a$ of the first slope is smaller than an inclination angle $\theta b$ of the second slope.

[Item 11]

An optical device comprising the optical stack of any one of Items 1 to 10.

Advantageous Effects of Invention

According to an embodiment of the present invention, there is provided an optical stack having an adhesive layer such that the degree to which the adhesive layer penetrates into dents of a concavo-convex structure of an optical sheet is reduced, and an optical device having such an optical stack.

DESCRIPTION OF EMBODIMENTS

Optical stacks according to embodiments of the present invention and optical devices having such optical stacks will be described. Embodiments of the present invention are not limited to what is illustrated below.

An optical stack according to an embodiment of the present invention includes: an optical sheet having a first principal face with a concavo-convex structure and a second principal face at an opposite side from the first principal face; and an adhesive layer that is disposed on the first principal face of the optical sheet. First, with reference to FIG. 1A, FIG. 1B, FIG. 2, FIG. 3, FIG. 4A, and FIG. 4B, an example will be described where an adhesive layer that is attached to a surface (first principal face) of an optical sheet featuring a concavo-convex structure has not penetrated into the dents of the concavo-convex structure.

Figure 1A:
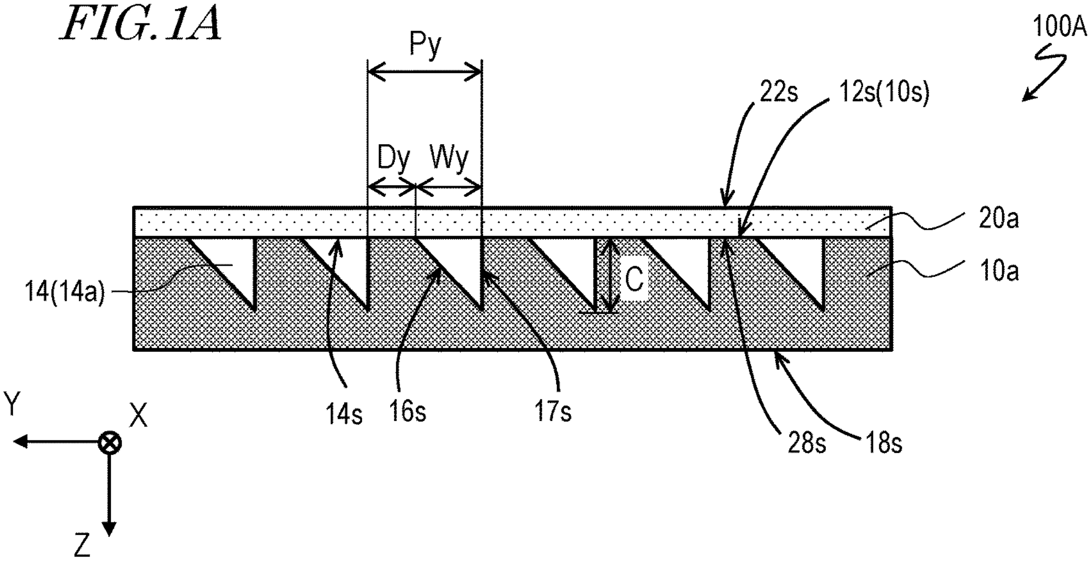
FIG. 1A A schematic cross-sectional view of an optical stack 100A according to an embodiment of the present invention.
Figure 1B:
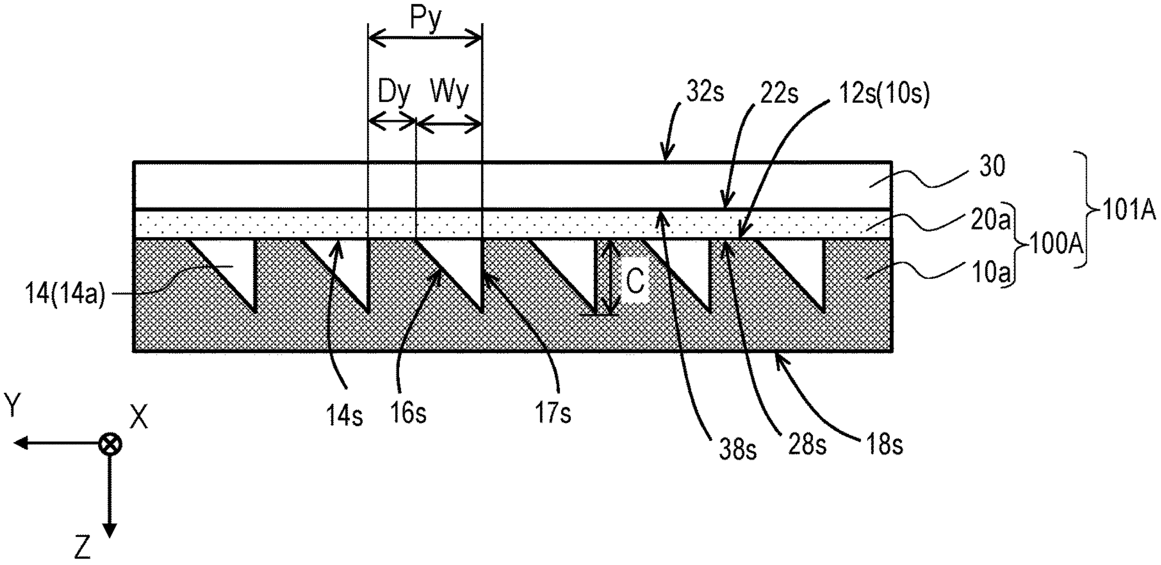
FIG. 1B A schematic cross-sectional view of an optical stack 101A according to another embodiment of the present invention.
Figure 2:
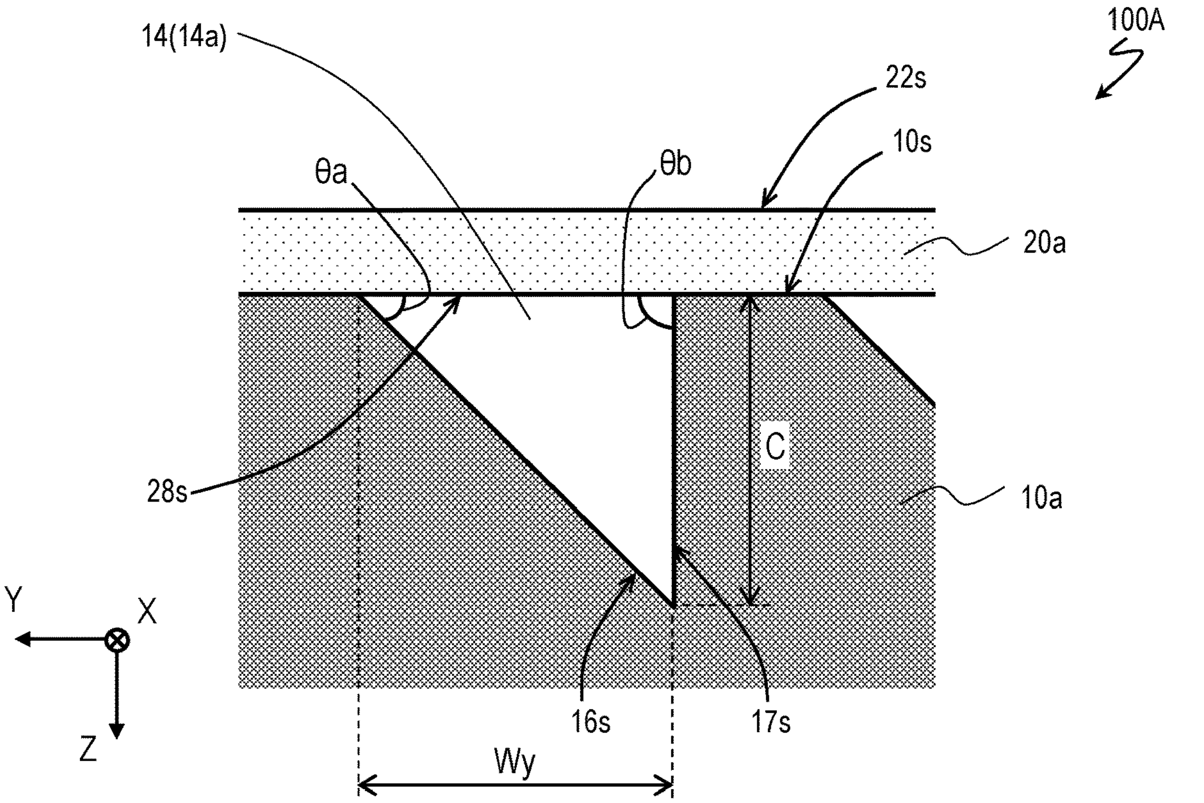
FIG. 2 A schematic cross-sectional view of the optical stack 100A.
Figure 3:
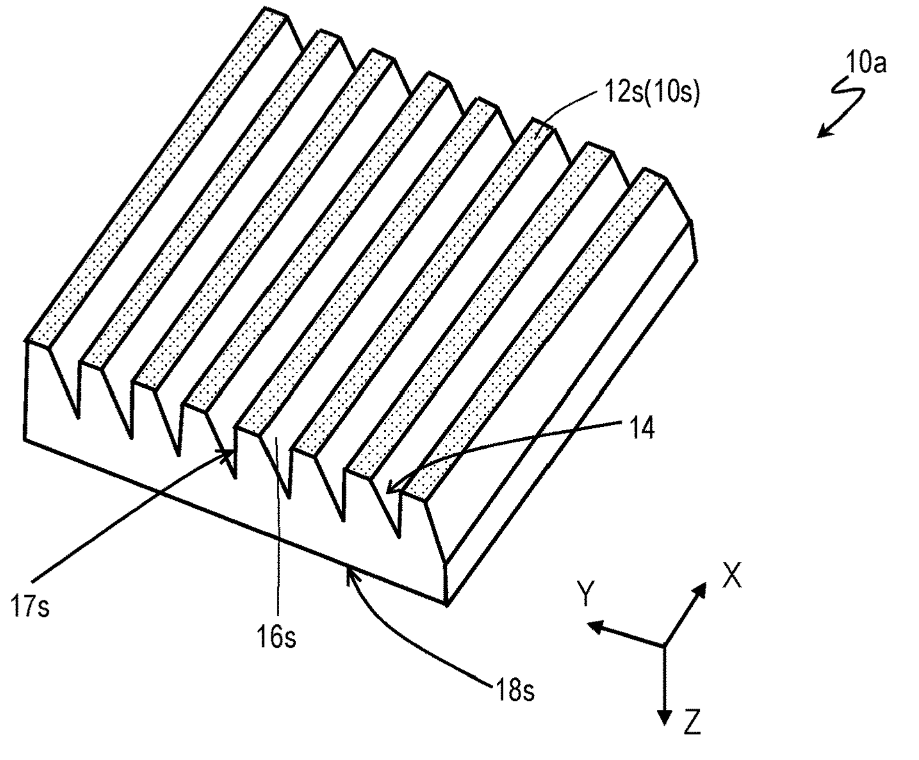
FIG. 3 A schematic perspective view of a first optical sheet 10*a* included in the optical stack 100A.
Figure 4A:
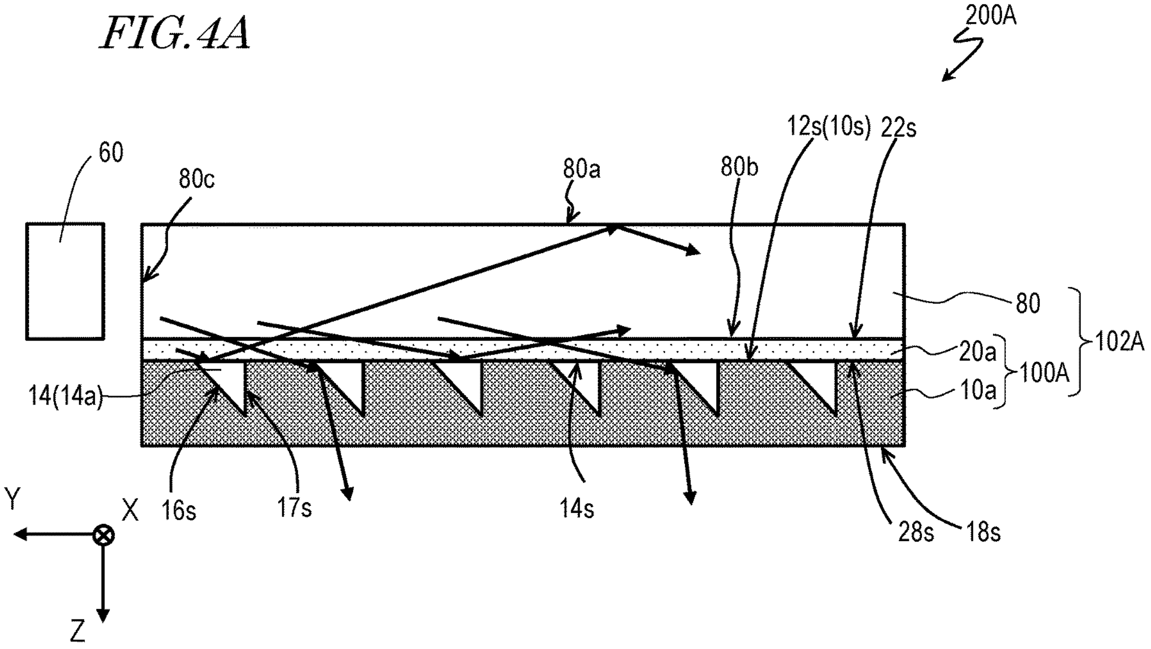
FIG. 4A A schematic cross-sectional view of an illumination device 200A that includes the optical stack 100A.

FIG. 1A shows a schematic cross-sectional view of an optical stack 100A according to an embodiment of the present invention. FIG. 1B shows a schematic cross-sectional view of an optical stack 101A according to an embodiment of the present invention. FIG. 2 is a schematic cross-sectional view showing enlarged a portion of the optical stack 100A. FIG. 3 is a schematic perspective view of an optical sheet 10*a* included in the optical stack 100A. FIG. 4A is a schematic cross-sectional view of an illumination device 200A that includes the optical stack 100A.

As shown in FIG. 1A, the optical stack 100A includes: the first optical sheet 10*a* having a first principal face 12*s* with a concavo-convex structure and a second principal face 18*s* at an opposite side from the first principal face 12*s*; and an adhesive layer 20*a* that is disposed on the first principal face 12*s* of the first optical sheet 10*a*. The concavo-convex structure on the first principal face 12*s* includes: a plurality of dents 14; and flat portions 10*s* between adjacent ones of the plurality of dents 14. The adhesive layer 20*a* is in contact with the flat portions 10*s*. The surface of the adhesive layer 20*a* and the first principal face 12*s* of the first optical sheet 10*a* together define an internal space 14*a* within each of the plurality of dents 14.

As shown in FIG. 1B, the optical stack 101A includes: the optical stack 100A; and a second optical sheet 30 at an opposite side of the adhesive layer 20*a* from the first optical sheet 10*a*. Since the description of the optical stack 100A is similarly applicable to the optical stack 101A unless otherwise specified, such description may be omitted in order to avoid redundancy.

The second optical sheet 30 included in the optical stack 101A has a principal face 38*s* at a side closer to the adhesive layer 20*a* and a principal face 32*s* at an opposite side from the principal face 38*s*. The principal face 38*s* is a flat surface. At an opposite side of the second optical sheet 30 of the optical stack 101A from the adhesive layer 20*a* (i.e., on the principal face 32*s*), at least one other optical component (or an optical sheet) may be provided. The other optical component (optical sheet) may include e.g. a diffusion plate and a light guide plate, and is adhesively bonded to the principal face 32*s* of the optical sheet 30 via an adhesive layer.

In the examples of FIG. 1A and FIG. 2, the adhesive layer 20*a* has not penetrated into the dents 14. In other words, no adhesive layer 20*a* exists within the spaces defined by the dents 14. A space defined by a dent 14 means a space that is defined by that dent 14 and by a sheet plane (a plane that is parallel to the XY plane) that contains flat portions 10*s* that are adjacent to that dent 14. Therefore, the internal spaces 14*a* defined by a surface 28*s* of the adhesive layer 20*a* closer to the first optical sheet 10*a* and by the first principal face 12*s* of the first optical sheet 10*a* coincide with the spaces defined by the dents 14 in this example. The internal spaces 14*a* may be referred to as air cavities or optical cavities. Typically, the internal spaces 14*a* are void portions filled with air inside. However, instead of air, the internal spaces 14*a* may be filled with a material having a lower refractive index than those of the first optical sheet 10*a* and the adhesive layer 20*a*. In a plan view (the XY plane) in which the optical sheet is viewed from the normal direction of the principal face, the plurality of internal spaces may appear so that: as in the example of FIG. 3, internal spaces which are continuous along the X direction (e.g. grooves in triangular prism shapes extending in the X direction) are provided discretely with respect to the Y direction; or, as in the example of FIG. 8A, they are provided in island shapes that are discrete with respect to both the X direction and the Y direction. As will be shown in FIG. 4A and FIG. 4B discussed later, in an illumination device that includes the optical stack 100A, the light-guiding direction in the lightguide layer 80 is the −Y direction. Although light propagates in various directions within the lightguide layer 80, the −Y direction will be referred to as the light-guiding direction, and light containing a (non-zero) component in the −Y direction will be said to be propagating in the −Y direction.

The optical stack 100A functions as a light distribution structure described in Patent Document 2 or 3. The optical stack 100A includes a plurality of internal spaces 14*a* that constitute interfaces for directing light in the Z direction (i.e., downward in the figure) via total internal reflection. The internal spaces 14*a* are defined by surfaces 16*s* and surfaces 17*s*, which are part of the first principal face 12*s* of the first optical sheet 10*a*, and by the surface 28*s* of the adhesive layer 20*a* closer to the first optical sheet 10*a*. Herein, each internal space 14*a* has a cross-sectional shape (i.e., shape of a cross-section which is perpendicular to the X direction and which is parallel to the YZ plane) that is a triangle. The interface created by the slope 16*s* functions as an interface for directing light in the Z direction (i.e., downward in the figure) via total internal reflection. Each of the plurality of dents 14, that is, each of the plurality of internal spaces 14*a*, includes: a slope (first slope) 16*s* to direct a portion of light propagating in the optical stack 100A toward the second principal face 18*s* side of the first optical sheet 10*a* (i.e., in the Z direction in the figure) via total internal reflection; and a slope (second slope) 17*s* opposite to the slope 16*s*. An inclination angle $\theta a$ of the slope 16*s* is e.g. not less than 100 and not more than 70°. The lower limit is preferably 30° or more, and more preferably 45° or more. When the inclination angle $\theta a$ is smaller than 10°, the controllability of light distribution will decrease, and the light extraction efficiency may also decrease. On the other hand, when the inclination angle $\theta a$ exceeds 70°, it may become difficult to process a textured film, for example. The inclination angle $\theta b$ of the slope 17*s* is e.g. not less than 50° and not more than 100°. Its lower limit is preferably 70° or more. When the inclination angle $\theta b$ is smaller than 50°, stray light may occur in unintended directions. On the other hand, when the inclination angle $\theta b$ exceeds 100°, it may become difficult to process a textured film, for example. The inclination angle $\theta a$ of the slope 16*s* and the inclination angle $\theta b$ of the slope 17*s* are angles relative to a direction that is parallel to the Y direction, in a cross-section of the dent 14 (a cross-section which is perpendicular to the X direction and which is parallel to the YZ plane). In this example, the inclination angle $\theta a$ of the slope 16*s* is smaller than the inclination angle $\theta b$ of the slope 17*s*. In an illumination device (see FIG. 4A, FIG. 4B) that includes the optical stack 100A, the slope 16*s* is disposed closer to a light source 60 than is the slope 17*s*. The shape of a cross-section (a cross-section which is perpendicular to the X direction and which is parallel to the YZ plane) of the internal space 14*a* is defined by the inclination angle $\theta a$ of the slope 16*s* and the inclination angle $\theta b$ of the slope 17*s*, a width Wy, and a depth C. Without being limited to what is illustrated, the shape of the internal space 14*a* (dent 14) may be modified in various ways. By adjusting the shape, size, density of placement, etc., of the internal spaces 14*a* (dents 14), distribution of rays (intensity distribution) emitted from the optical stack 100A can be adjusted (see, for example, Patent Documents 2 and 3).

The optical stack functioning as a light distribution control structure may constitute a lightguide layer and/or a redirection layer having a plurality of internal spaces. For example, as shown in FIG. 4A, the optical stack 100A is used for an illumination device 200A. The illumination device 200A includes an optical stack 102A and a light source 60. The optical stack 102A includes: the optical stack 100A; and a lightguide layer 80 at an opposite side of the adhesive layer 20*a* of the optical stack 100A from the first optical sheet 10*a*. The lightguide layer 80 is adhesively bonded to a surface 22*s* of the adhesive layer 20*a* at an opposite side from the first optical sheet 10*a*, for example. The lightguide layer 80 has a first principal face 80*a*, a second principal face 80*b* at an opposite side from the first principal face 80*a*, and a light-receiving portion 80*c* to receive light which is emitted from the light source 60. The light source 60 is e.g. an LED device, or an array of a plurality of LED devices may be used. As is indicated by arrows in FIG. 4A, a portion of light that is led into the lightguide layer 80 undergoes total internal reflection (Total Internal Reflection: TIR) at the interface 16*s* and interface 14*s* created by the internal spaces 14*a*. Light that has undergone total internal reflection at the interface 14*s* (i.e., the surface 28*s* of the adhesive layer 20*a* closer to the first optical sheet) propagates in the lightguide layer 80 and the adhesive layer 20*a*, whereas light that has undergone total internal reflection at the slope 16*s* is emitted outside of the optical stack 102A from the second principal face 18*s* side of the first optical sheet 10*a*.

Preferably, refractive indices of the lightguide layer 80, the adhesive layer 20*a*, and the first optical sheet 10*a* are essentially equal to one another. The difference in refractive index between the lightguide layer 80 and the adhesive layer 20*a* (absolute value) and the difference in refractive index between the adhesive layer 20*a* and the first optical sheet 10*a* (absolute value) are, each independently, preferably e.g. 0.20 or less, more preferably 0.15 or less, and still more preferably 0.10 or less.

The thickness of the adhesive layer 20*a* is e.g. not less than 0.01 μm and not more than 15.0 μm. Its lower limit value is preferably 4.0 μm or more. Its upper limit value is preferably 11.0 μm or less, and more preferably 9.0 μm or less. Unless otherwise specified, the thickness of the adhesive layer refers to its thickness above the flat portions 10*s* of the first principal face 12*s* of the first optical sheet 10*a*.

The optical stack 100A has a haze value of e.g. 5.0% or less. The haze value can be measured by using a haze meter (machine name: "HZ-1", manufactured by Suga Testing Machinery Co.), with D65 light, for example.

Figure 4B:
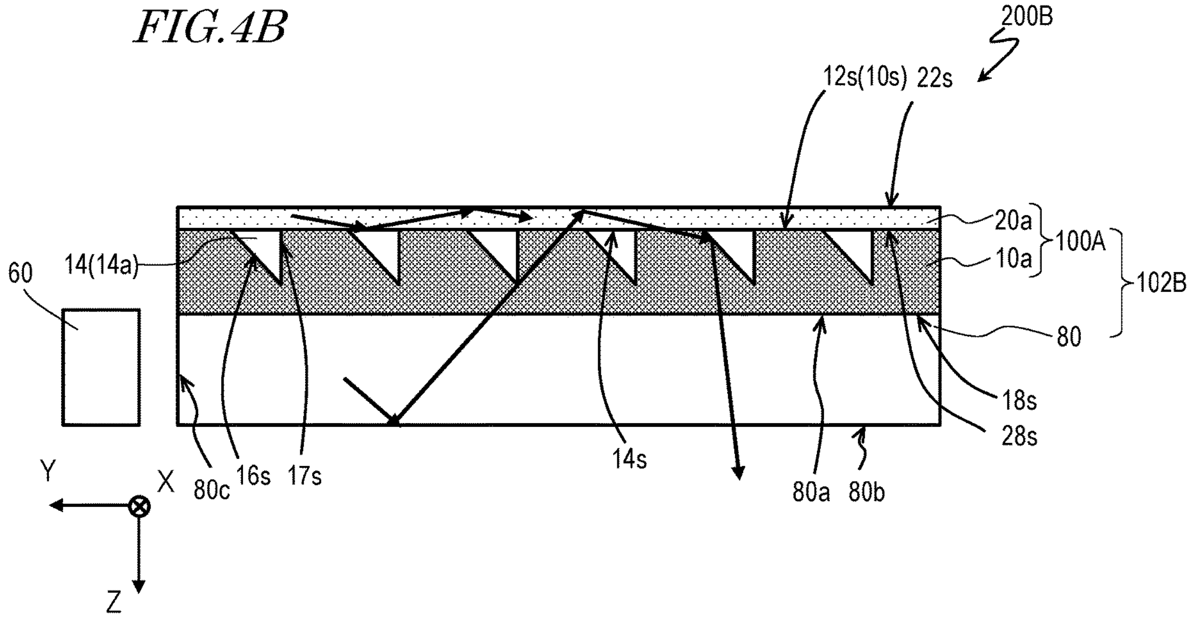
FIG. 4B A schematic cross-sectional view of an illumination device 200B that includes the optical stack 100A.

As in an illumination device 200B shown in FIG. 4B, the lightguide layer 80 may be provided on the first optical sheet 10*a* side of the optical stack 100A (i.e., so as to be closer to the first optical sheet 10*a* than to the adhesive layer 20*a*). The lightguide layer 80 and the first optical sheet 10*a* may be attached via an adhesive layer. In the illumination device 200B, too, light that has undergone total internal reflection at the interface 14*s* (surface 28*s* of the adhesive layer 20*a* closer to the first optical sheet) propagates in the adhesive layer 20*a*, whereas light that has undergone total internal reflection at the slope 16*s* is emitted outside of the optical stack 102B from the second principal face 18*s* side of the first optical sheet 10*a*.

Without being limited to the aforementioned examples, illumination devices according to embodiments of the present invention may be modified in various ways. For example, in the illumination device 200A, a substrate layer may be provided at an opposite side of the optical stack 100A from the lightguide layer 80. Instead of the substrate layer, an anti-reflection layer may be used; instead of the substrate layer, a hard coat layer (e.g. pencil hardness H or higher) may be provided. An anti-reflection layer and/or a hard coat layer may be provided on the substrate layer. At an opposite side from the outgoing surface (i.e., upward in the figure) of the lightguide layer 80, an anti-reflection layer and/or a hard coat layer may be provided. The anti-reflection layer and the hard coat layer can be formed by using known materials and known methods. A low-refractive index layer may be provided between the optical stack 102A and the substrate layer (or anti-reflection layer and/or hard coat layer).

In the exemplary illumination device 200B, a substrate layer may be provided at an opposite side of the optical stack 100A from the lightguide layer 80. Instead of the substrate layer, an anti-reflection layer and/or a hard coat layer (e.g. pencil hardness H or higher) may be provided. An anti-reflection layer and/or a hard coat layer may be provided on the substrate layer. An anti-reflection layer and/or a hard coat layer may be provided at the outgoing surface side (i.e., downward in the figure) of the lightguide layer 80. A low-refractive index layer may be provided between the optical stack 102B and the substrate layer (or anti-reflection layer and/or hard coat layer).

As shown in FIG. 3, the first optical sheet 10*a* is such that, in a plan view from the normal direction of the first principal face 12*s*, each of the plurality of dents 14 extends along the X direction and is continuous along the X direction. The plurality of dents 14 are provided discretely with respect to the Y direction, with flat portions 10*s* provided between dents 14. Regarding the Y direction, the dents 14 are provided preferably periodically along the Y direction, with a pitch Py of e.g. not less than 6 μm and not more than 120 μm. The width Wy of the dents 14 is e.g. not less than 3 μm and not more than 20 μm, and a width Dy of the flat portions 10*s* is e.g. not less than 3 μm and not more than 100 μm. A ratio Wy/Dy between the width Wy of the dents 14 and the width Dy of the flat portions 10*s* is e.g. not less than 0.3 and not more than 7. The depth C (depth along the Z direction) of the dents 14 is e.g. not less than 1 μm and not more than 100 μm. The depth C of the dents 14 is preferably 20 μm or less, and more preferably 12 μm or less. The depth C of the dents 14 is preferably 4 μm or more, more preferably 6 μm or more, and more preferably 8 μm or more.

Regarding the density of the plurality of dents 14, in a plan view of the first optical sheet 10*a* from the normal direction of the first principal face 12*s*, a ratio of the area (occupied area percentage) of the plurality of dents 14 to the area of the first optical sheet 10*a* is preferably 0.3% or more, from the standpoint of obtaining a good luminance. The occupied area percentage of the plurality of dents 14 is to be appropriately selected in accordance with the intended application; for example, in applications where transparency is needed, it is preferably not less than 0.3% and not more than 10%, and more preferably not less than 0.5% and not more than 4%. In applications where higher luminance is required, it is preferably not less than 30% and not more than 80%. Note that the occupied area percentage of the plurality of dents 14 may be uniform, or the occupied area percentage may increase with increasing distance from the light source to ensure that luminance will not decrease with increasing distance from the light source (e.g., the light source 60 in FIG. 4A or FIG. 4B).

Figure 8A:
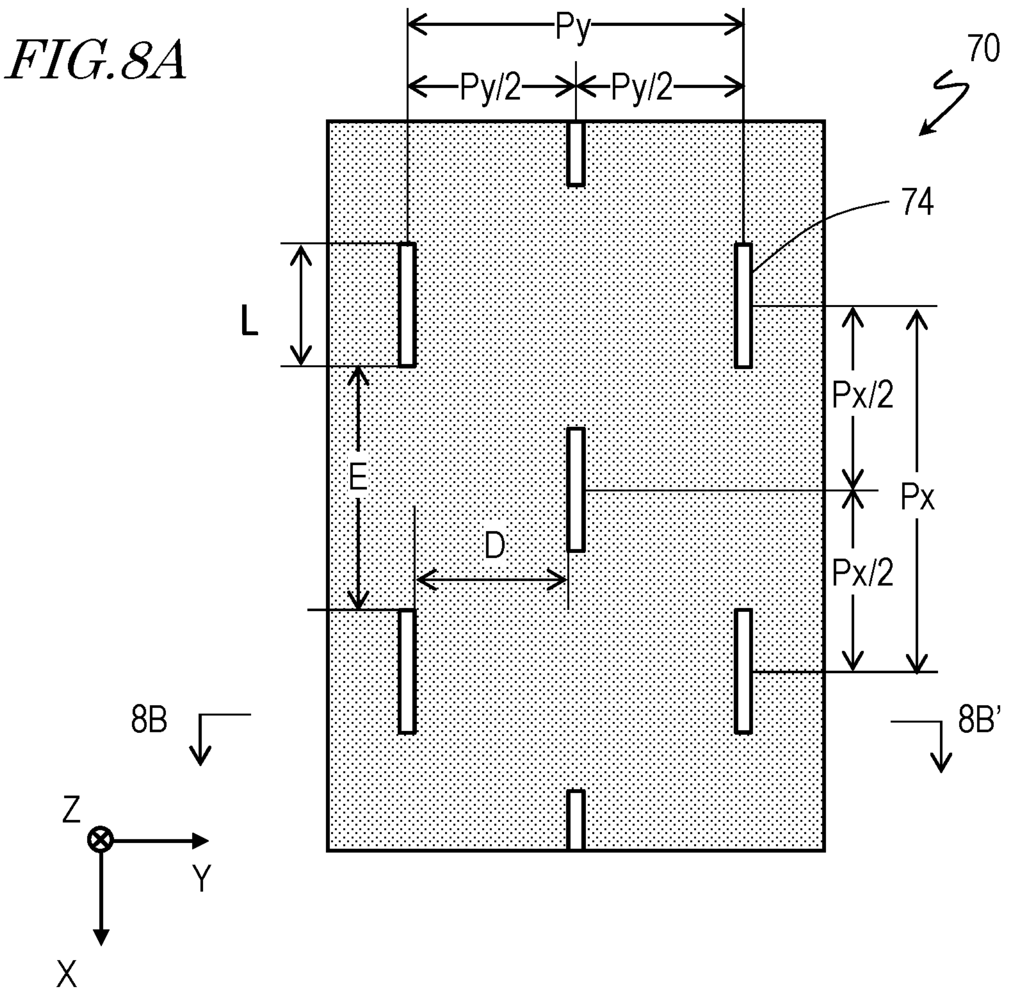
FIG. 8A A schematic plan view of a concavo-convex textured film 70 included in an optical stack according to an embodiment of the present invention.
Figure 8B:
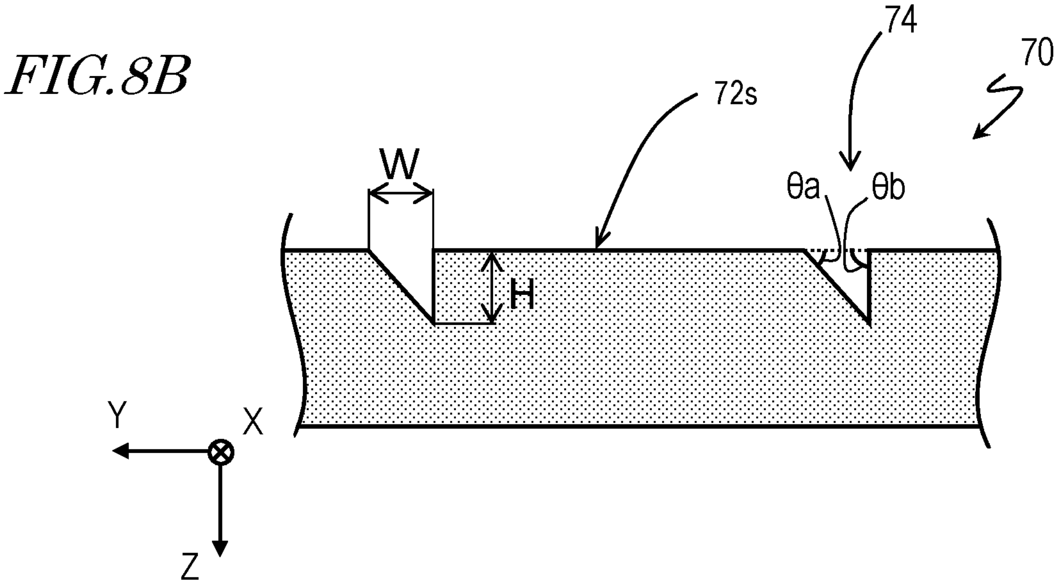
FIG. 8B A schematic cross-sectional view of the concavo-convex textured film 70.

Instead of the first optical sheet 10*a*, a concavo-convex textured film 70 (optical sheet) as shown in FIG. 8A and FIG. 8B may be used, for example. The concavo-convex textured film 70 has a principal face with a concavo-convex structure, where the concavo-convex structure includes a plurality of dents 74 and flat portions 72*s* between adjacent dents 74. In a plan view in which the textured film 70 is viewed from the normal direction of the principal face (see FIG. 8A), the plurality of dents 74 are provided in island shapes that are discrete with respect to both the X direction and the Y direction. In the textured film 70, the size (length L, width W: see FIG. 8A and FIG. 8B) of the dents 74 is such that the length L is preferably not less than 10 μm and not more than 500 μm, and the width W is preferably not less than 1 μm and not more than 100 μm, for example. From the standpoint of light extraction efficiency, the depth H is preferably not less than 1 μm and not more than 100 μm. The depth H of the dents 74 is preferably 20 μm or less, and more preferably 12 μm or less. The depth H of the dents 74 is preferably 4 μm or more, more preferably 6 μm or more, and more preferably 8 μm or more. In the case where the plurality of dents 74 are to be distributed discretely and uniformly, they are disposed preferably periodically as shown in FIG. 8A, for example. The pitch Px is preferably e.g. not less than 10 μm and not more than 500 μm, and the pitch Py is preferably e.g. not less than 10 μm and not more than 500 μm. Without being limited to the example of FIG. 8A, when used in an illumination device, the plurality of dents may be disposed discretely with respect to the light-guiding direction of the lightguide layer and any direction intersecting the light-guiding direction of the lightguide layer.

Regarding the density of the plurality of dents 74, in a plan view (FIG. 8A) of the textured film 70 from the normal direction of the principal face, a ratio of the area (occupied area percentage) of the plurality of dents 74 to the area of the textured film 70 is preferably 0.3% or more, from the standpoint of obtaining a good luminance. The occupied area percentage of the plurality of dents 74 is to be appropriately selected in accordance with the intended application; for example, in applications where transparency is needed, it is preferably 30% or less in order to obtain a good visible light transmittance and haze value, and preferably 1% or more from the standpoint of obtaining a good luminance. Its upper limit value is still more preferably 25% or less, and, for a high visible light transmittance, it is preferably 10% or less, and still more preferably 5% or less. For example, it is preferably not less than 0.3% and not more than 10%, and more preferably not less than 0.5% and not more than 4%. In applications where higher luminance is required, it is preferably not less than 30% and not more than 80%. Note that the occupied area percentage of the plurality of dents 74 may be uniform, or the occupied area percentage may increase with increasing distance from the light source to ensure that luminance will not decrease with increasing distance from the light source (e.g., the light source 60 in FIG. 4A or FIG. 4B).

An example has been illustrated where the dents 14 have a triangular cross-sectional shape. Without being limited to this example, however, the cross-sectional shape of the dents 14 may be a rectangle (e.g. a trapezoid) so long as it has a surface that can create an interface for directing light in the Z direction via total internal reflection, for example. Without being limited to a polygon, it may be a shape that contains a curve.

Figure 9A:
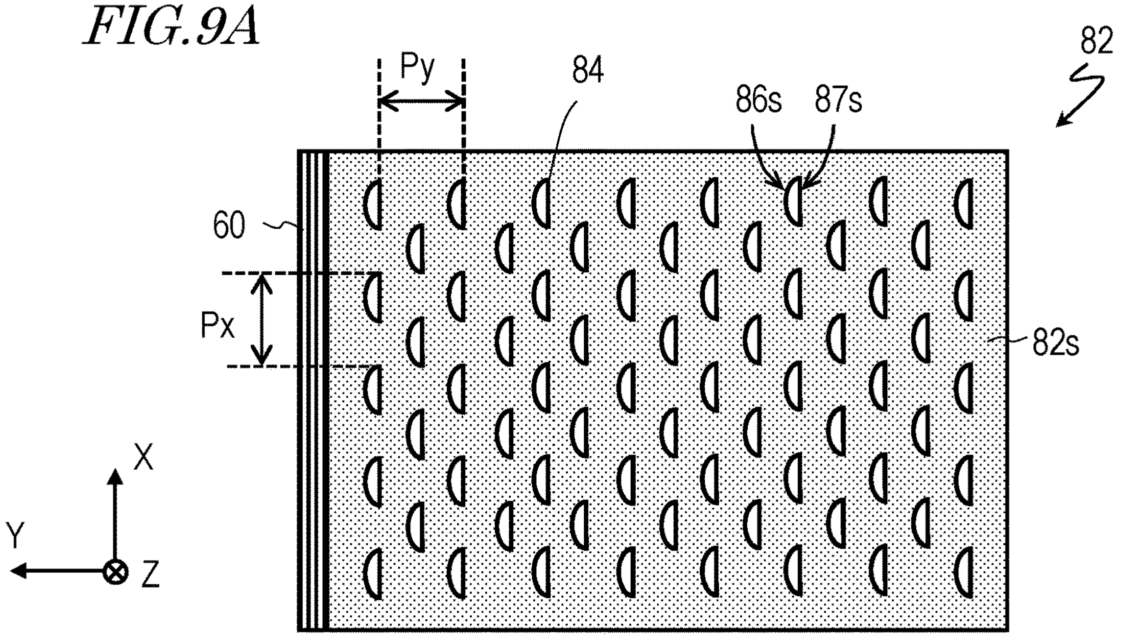
FIG. 9A A schematic plan view of a concavo-convex textured film 82 included in an optical stack according to an embodiment of the present invention.
Figure 9B:
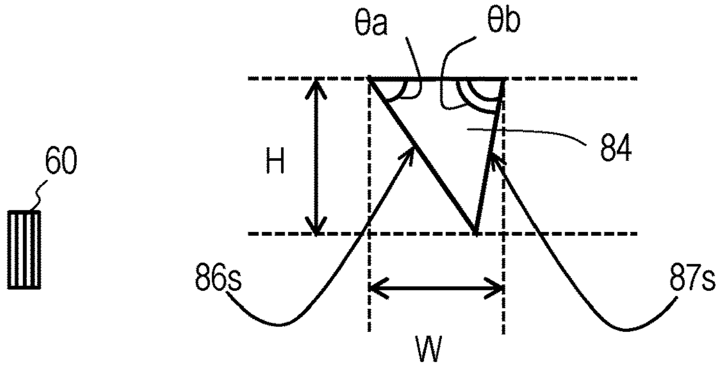
FIG. 9B A schematic cross-sectional view of a dent 84 in the concavo-convex textured film 82.
Figure 9C:
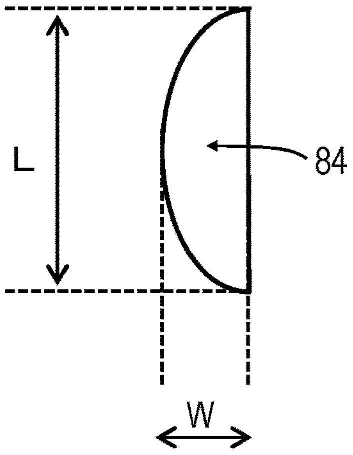
FIG. 9C A schematic plan view of a dent 84 in the concavo-convex textured film 82.

Instead of the first optical sheet 10*a*, a concavo-convex textured film 82 (optical sheet) as used in FIG. 9A may be used, for example. FIG. 9A also illustrates the light source 60. The concavo-convex textured film 82 has a principal face with a concavo-convex structure, where the concavo-convex structure includes a plurality of dents 84 and flat portions 82*s* between adjacent dents 84. Each of the plurality of dents 84 includes: a first slope 86*s* to direct a portion of light propagating in the optical stack in the Z direction via total internal reflection; and a second slope 87*s* at an opposite side from the first slope 86*s*. As shown in FIG. 9A, in a plan view as viewed from the normal direction of the principal face of the concavo-convex textured film 82 featuring the concavo-convex structure, the first slope 86*s* of each dent 84 presents a curved surface that is convex toward the light source 60. In the case where a plurality of LED devices arranged along the X direction are used as the light source 60, light that is emitted from each LED device has some spread with respect to the Y direction; therefore, the first slope 86*s* will act more uniformly for light if the first slope 86*s* has a curved surface that is convex toward the light source LS. In the case where coupling optics are provided between the light source 60 and the light-receiving portion 80*c* of the lightguide layer 80 to ensure that light of a high degree of parallelism (i.e., light having little spread with respect to the Y direction) will be incident, the first slope 86*s* may be parallel to the X direction. The preferable ranges of the size (length L, width W: see FIG. 9B and FIG. 9C) and the depth H (see FIG. 9C) and the pitches Px and Py of the dents 84 may be identical to those of the dents 74 of the concavo-convex textured film 70, for example.

The optical stack 100A can be produced by attaching the adhesive layer 20*a* to the surface 12*s* of the first optical sheet 10*a* featuring a concavo-convex structure by roll-to-roll method, for example. From the mass producibility standpoint, the optical stack 100A is preferably produced in roll-to-roll fashion.

Next, with reference to FIG. 5A, FIG. 5B, FIG. 5C, FIG. 6A, and FIG. 6B, an example will be described where an adhesive layer that is attached to a surface (first principal face) of an optical sheet featuring a concavo-convex structure has penetrated into the dents of the concavo-convex structure.

Figure 5A:
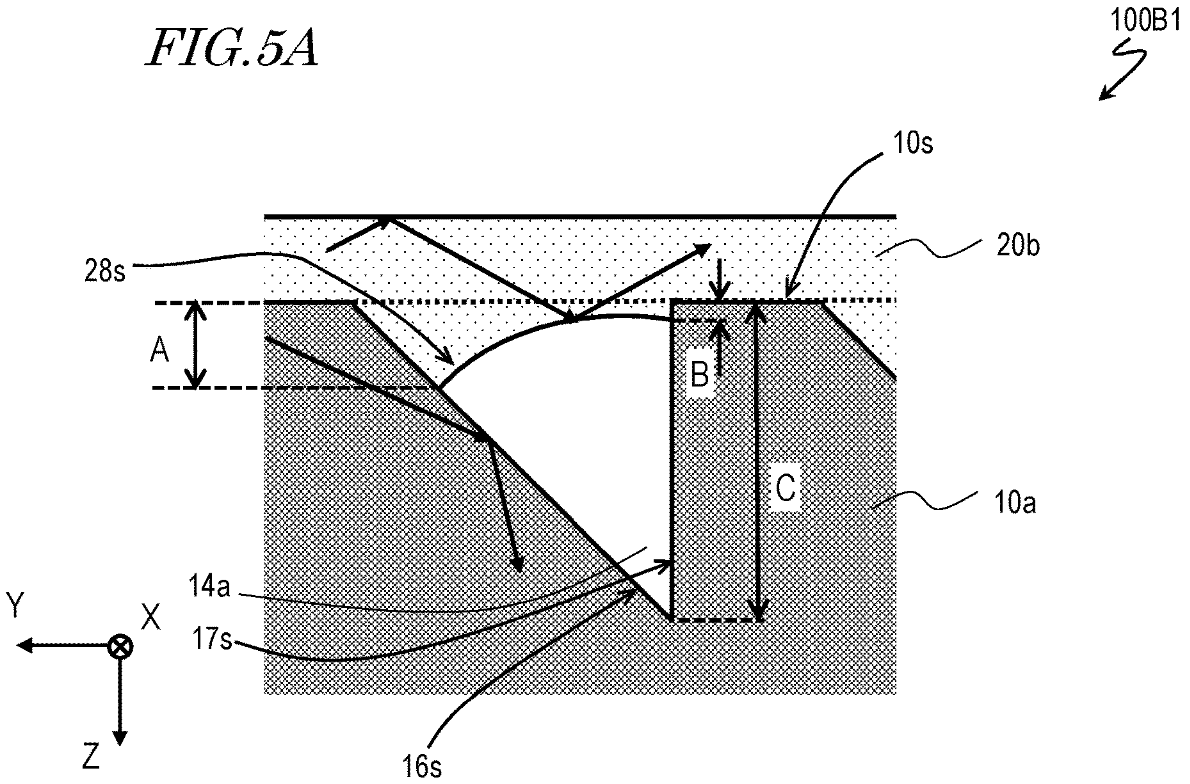
FIG. 5A A schematic cross-sectional view of an optical stack 100B1 according to another embodiment of the present invention.
Figure 5B:
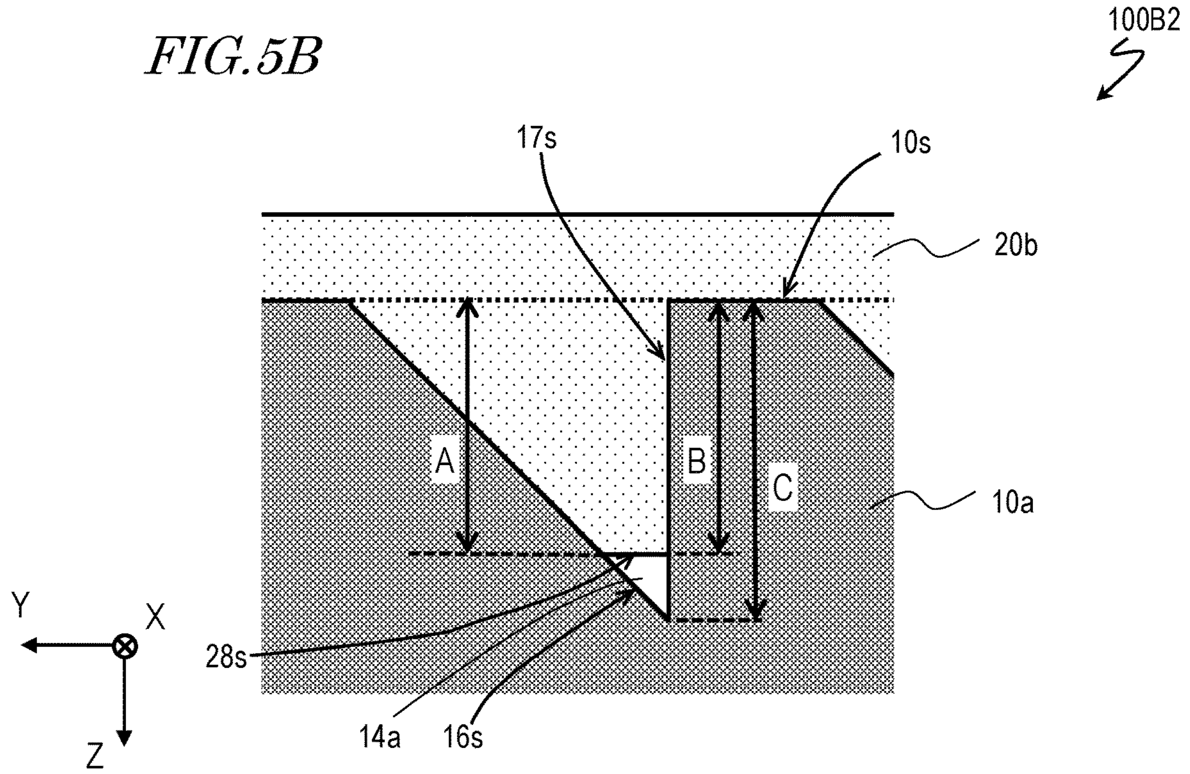
FIG. 5B A schematic cross-sectional view of an optical stack 100B2 according to still another embodiment of the present invention.
Figure 5C:
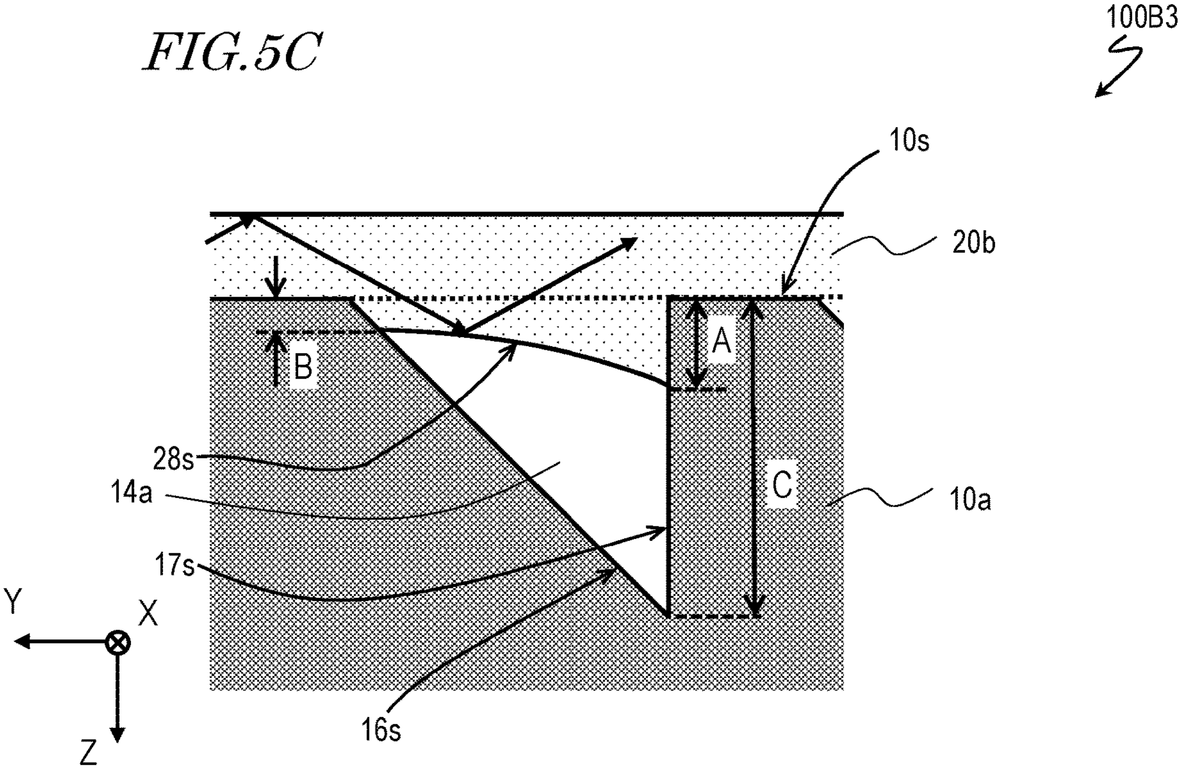
FIG. 5C A schematic cross-sectional view of an optical stack 100B3 according to still another embodiment of the present invention.
Figure 6A:
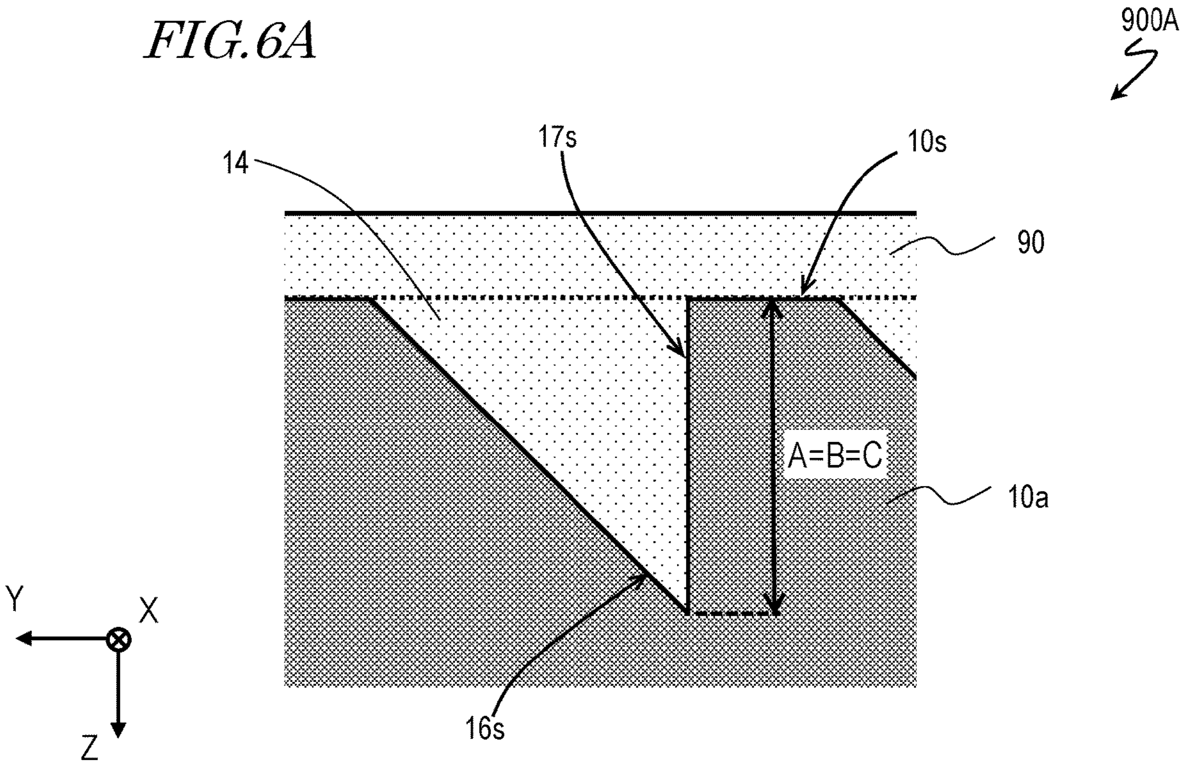
FIG. 6A A schematic cross-sectional view of an optical stack 900A according to Comparative Example.
Figure 6B:
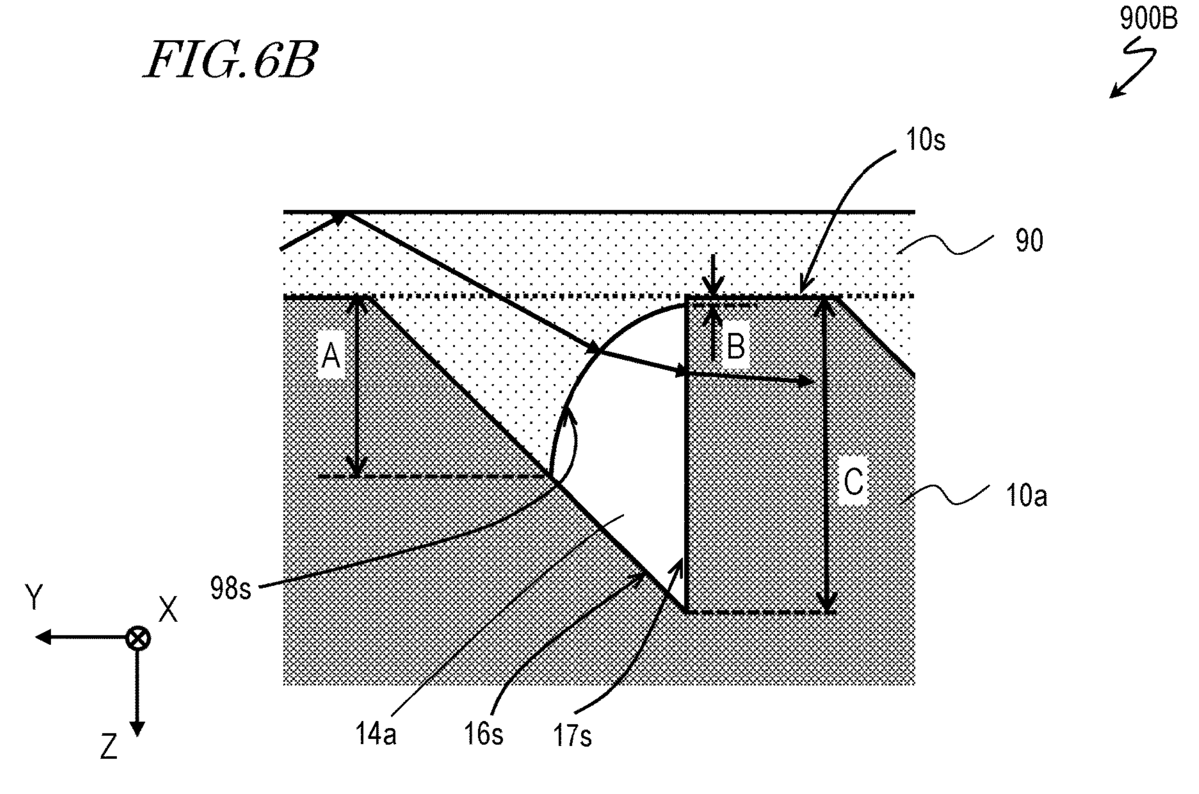
FIG. 6B A schematic cross-sectional view of an optical stack 900B according to Comparative Example.

FIG. 5A is a schematic cross-sectional view of an optical stack 100B1 according to another embodiment of the present invention, and FIG. 5B is a schematic cross-sectional view of an optical stack 100B2 according to still another embodiment of the present invention. FIG. 5C is a schematic cross-sectional view of an optical stack 100B3 according to still another embodiment of the present invention. FIG. 6A is a schematic cross-sectional view of an optical stack 900A according to Comparative Example, and FIG. 6B is a schematic cross-sectional view of an optical stack 900B according to Comparative Example. Each of FIG. 5A, FIG. 5B, FIG. 5C, FIG. 6A, and FIG. 6B is a diagram showing the neighborhood of the dents 14 enlarged. The optical stacks 100B1, 100B2 and 100B3 differ from the optical stack 100A with respect to the shape of the adhesive layer 20*b*. In the optical stacks 100B1, 100B2 and 100B3, since the adhesive layer 20*b* penetrates into the dents 14 of the concavo-convex structure of the first optical sheet 10*a*, the internal spaces 14*a* defined by the surface 28*s* of the adhesive layer 20*b* closer to the first optical sheet 10*a* and by the first principal face 12*s* of the first optical sheet 10*a* do not coincide with the spaces defined by the dents 14. The optical stacks 900A and 900B according to Comparative Example differ from the optical stack 100A with respect to the shape of the adhesive layer 90.

In the optical stack 100B1 of FIG. 5A, each of the plurality of dents 14 satisfies 0.10≤(C−A)/C≤1.00 (which hereinafter may be referred to as "formula (I)") and 0.75≤(C−A)/(C−B) (which hereinafter may be referred to as "formula (II)"), where A is a maximum height value of the adhesive layer 20*b* existing in that dent 14; B is a minimum height value of the adhesive layer 20*b* existing in that dent 14; and C is the depth of that dent 14. Even if the adhesive layer has penetrated into the dents, an optical stack that satisfies formula (I) and formula (II) functions as a light distribution control structure, because influences on light distribution control exerted by the penetration of the adhesive layer into the dents are reduced. The optical stack 100B2 in FIG. 5B and the optical stack 100B3 in FIG. 5C are other examples of satisfying formula (I) and formula (II), whereas the optical stacks 900A and 900B according to Comparative Example in FIG. 6A and FIG. 6B are examples of not satisfying formula (I) and formula (II). In the earlier-described optical stack 100A, A=B=0 holds, meaning that the optical stack 100A also satisfies formula (I) and formula (II). The depth C of a dent 14 is the length of the dent 14 along the Z direction in a cross-sectional shape (i.e., the shape of a cross-section which is perpendicular to the X direction and which is parallel to the YZ plane in the figure) of that dent 14. The height of the adhesive layer 20*b* existing in a dent 14 is the height of the adhesive layer 20*b* along the Z direction in a cross-section (i.e., a cross-section which is perpendicular to the X direction and which is parallel to the YZ plane) of that dent 14, as determined relative to the flat portions 10*s*. A, B, and C in formula (I) and formula (II) can be determined through measurements from a cross-sectional image of the dent 14, as is carried out in below-described Examples, for example. Preferably, any three cross-sectional images of the dent 14 may be arbitrarily chosen, for example, and A, B, and C in formula (I) and formula (II) are measured, and their mean value is determined.

In formula (I), (C−A)/C represents the degree to which the adhesive layer fills the dent 14 of the concavo-convex structure of the optical sheet. It also represents the ratio (degree) by which the slope 16*s*, which can create an interface to direct light in the Z direction via total internal reflection, is covered by the adhesive layer. The portion of the slope 16*s* that is exposed from the adhesive layer is able to create an interface to direct light in the Z direction via total internal reflection. As in the optical stack 100A shown in FIG. 2, if the adhesive layer 20*a* has not penetrated into the dent 14, A=0; that is, (C−A)/C=1. As in the optical stack 900A according to Comparative Example of FIG. 6A, if the dent 14 has been completely filled by the adhesive layer 90*a*, no internal space is created that constitutes a light distribution control structure. In this case, A=C; that is, (C−A)/C=0. As (C−A)/C decreases, the light extraction efficiency decreases, and therefore the luminance decreases. When (C−A)/C is less than 0.10, the luminance may not be sufficient, thus possibly diminishing usability as an optical device (illumination device). Preferably, (C−A)/C is as close to 1 as possible, from the standpoint of light distribution characteristics, and especially from the luminance standpoint. For example, (C−A)/C is preferably 0.30 or more, more preferably 0.50 or more, more preferably 0.70 or more, more preferably 0.80 or more, and still more preferably 0.85 or more.

In formula (II), (C−A)/(C−B) is used as an index of inclination of the surface 28*s* (i.e., an interface with the air layer) of the adhesive layer 20*b* penetrating into the dent 14. The closer (C−A)/(C−B) is to 1, the closer to being parallel to the sheet plane (the XY plane) the surface 28*s* (i.e., an interface with the air layer) of the adhesive layer 20*b* in the dent 14 is, thereby maintaining functionality as an interface to cause total internal reflection of light propagating in the adhesive layer 20*b*. For instance, the optical stack 100B2 in FIG. 5B is an example of A=B; that is, (C−A)/(C−B)=1. Because the surface 28*s* of the adhesive layer defining the internal space 14*a* is parallel to the sheet plane, light propagating in the adhesive layer 20*b* undergoes total internal reflection at the surface 28*s* of the adhesive layer 20*b*. In the exemplary optical stack 100B2 of FIG. 5B, the dent 14 is partly filled; that is, (C−A)/C is smaller than that of the optical stack 100A in FIG. 2. Therefore, the light extraction efficiency is lower than that of the optical stack 100A in FIG. 2, but there is little difference in intensity distribution. In the optical stack 100B1 of FIG. 5A and the optical stack 100B3 of FIG. 5C, too, the surface 28*s* (i.e., an interface with the air layer) of the adhesive layer 20*b* in the dent 14 is able to function as an interface to cause total internal reflection of light propagating in the adhesive layer 20*b*. The smaller (C−A)/(C−B) is, the greater the inclination of the surface of the adhesive layer 20*b* in the dent 14 to the sheet plane (the XY plane) is. The optical stack 900B according to Comparative Example in FIG. 6B schematically represents an example of not satisfying formula (II). When the surface 98*s* of the adhesive layer 90*b* in the dent 14 is greatly inclined from the sheet plane as in the optical stack 900B according to Comparative Example, as is indicated by arrows in FIG. 6B, total internal reflection may not occur at the surface 98*s* of the adhesive layer 90*b*, and light propagating in the adhesive layer may enter the internal space 14*a*, thus allowing light to leak in directions other than the intended outgoing direction (stray light).

Without being limited to a triangle, the cross-sectional shape of the dents 14 may be a rectangle (e.g., a trapezoid) so long as it has an interface for directing light in the Z direction via total internal reflection, for example. Without being limited to a polygon, it may be a shape that at least partially contains a curve. A shape that at least partially contains a curve is a shape that includes a part of the circumference of a circle or an ellipse, or a combination of multiple curves of different curvatures, for example. In either case, influences on light distribution control can be suppressed when formula (I) and formula (II) are satisfied.

In the exemplary optical stack 100B1 of FIG. 5A, the maximum height value A of the adhesive layer 20*b* in the dent 14 is the height of the adhesive layer 20*b* above the slope 16*s*, whereas the minimum height value B of the adhesive layer 20*b* in the dent 14 is the height of the adhesive layer 20*b* above the slope 17*s*, for example. In such a case, formula (I) and formula (II) can also be expressed as follows. Each of the plurality of dents 14 includes: a slope (first slope) 16*s* to direct a portion of light propagating in the optical stack toward the second principal face 18*s* side of the first optical sheet 10*a* (i.e., in the Z direction in the figure) via total internal reflection; and a slope (second slope) 17*s* opposite to the slope 16*s*. Given a height Dx of the adhesive layer 20*b* above the first slope 16*s* of that dent 14, a height Dy of the adhesive layer 20*b* above the second slope 17*s* of that dent 14, and a depth C of that dent 14, 0.10≤(C−Dx)/C≤1.00 (which hereinafter may be referred to as "formula (Ia)") and 0.75≤(C−Dx)/(C−Dy) (which hereinafter may be referred to as "formula (IIa)") are satisfied. Although there is no particular limitation as to the upper limit of (C−Dx)/(C−Dy), from the standpoint of light distribution characteristics, it is preferably 2.0 or less, more preferably 1.5 or less, and still more preferably 1.2 or less. However, it will be appreciated that the example of FIG. 5A is not limiting; for example, as in the optical stack 100B3 of FIG. 5C, there may be a case where the height of the adhesive layer 20*b* above the slope 17*s* is the maximum height value A of the adhesive layer 20*b* in the dent 14 and the height of the adhesive layer 20*b* above the slope 16*s* is the minimum height value B of the adhesive layer 20*b* in the dent 14.

Examples of Preferable Configurations of Adhesive Layer

Specific examples of an adhesive layer included in an optical stack according to an embodiment of the present invention will be illustrated below. When attached to a surface of an optical sheet featuring a concavo-convex structure, each of adhesive layers Aa, Ab and Ac below, its penetration into the dents of the concavo-convex structure and its change over time are suppressed, and therefore is suitably used for an optical stack according to an embodiment of the present invention. Note that the adhesive layer included in an optical stack according to an embodiment of the present invention is not to be limited to the examples below.

(1) Adhesive Layer Aa

International Publication No. 2021/167090 by the applicant describes an adhesive layer (which hereinafter may be referred to as "adhesive layer Aa") which has a creep deformation rate of 10% or less when a stress of 10000 Pa is applied for 1 second at 50° C. and a creep deformation rate of 16% or less when a stress of 10000 Pa is applied for 30 minutes at 50° C. in a creep test using a rotational rheometer, and which has a 180° peel adhesive strength of 10 mN/20 mm or more with respect to a PMMA film. According to a study by the applicant, the degree of penetration into the dents, as well as change over time thereof, when an adhesive layer is attached to a surface of an optical sheet featuring a concavo-convex structure is correlated with the creep deformation rate of the adhesive layer. Specifically, an adhesive layer which has a creep deformation rate of 10% or less when a stress of 10,000 Pa is applied for 1 second at 50° C. in a creep test using a rotational rheometer has a reduced degree of penetration into the dents of the concavo-convex structure when being attached to a surface having a concavo-convex structure, and an adhesive layer which has a creep deformation rate of 16% or less when a stress of 10,000 Pa is applied for 30 minutes (1800 seconds) at 50° C. in a creep test using a rotational rheometer has reduced change over time in its degree of penetration into the dents of the concavo-convex structure. The entire disclosure of International Publication No. 2021/167090 is incorporated herein by reference.

(2) Adhesive Layer Ab

International Publication No. 2021/167091 by the applicant describes an adhesive layer (which hereinafter may be referred to as "adhesive layer Ab") which is formed by curing a curable resin in an adhesive composition that includes: a polymer including a copolymer of at least one (meth)acrylate monomer and at least one copolymerizable functional group-containing monomer selected from the group consisting of hydroxyl group-containing copolymerizable monomers, carboxyl group-containing copolymerizable monomers, and nitrogen-containing vinyl monomers; and the curable resin, the adhesive composition having a 23° C. initial tensile modulus of elasticity of not less than 0.35 MPa and not more than 8.00 MPa before curing the curable resin in the adhesive composition, and a 23° C. initial tensile modulus of elasticity of 1.00 MPa or more after curing the curable resin in the adhesive composition. Because the 23° C. initial tensile modulus of elasticity before curing the curable resin in the adhesive composition is 0.35 MPa or more, the adhesive composition is restrained from entering into the plurality of dents at the formation of the adhesive layer 20*a*, i.e., when applying the adhesive composition layer on the first principal face 12*s* of the optical sheet 10*a*. Because the 23° C. initial tensile modulus of elasticity of the adhesive composition before curing the curable resin in the adhesive composition is 8.00 MPa or less, the adhesive composition layer has enough softness (ease of deformation) for being applied onto the first principal face 12*s* of the optical sheet 10*a*. Because the 23° C. initial tensile modulus of elasticity after curing the curable resin in the adhesive composition is 1.00 MPa or more, after the adhesive layer 20*a* is formed, entry into the plurality of dents through deformation over time of the adhesive layer 20*a* is suppressed. The entire disclosure of International Publication No. 2021/167091 is incorporated herein by reference.

The polymer included in the adhesive composition may be, for example, a copolymer, including a copolymer of: at least one (meth)acrylate monomer (e.g., alkyl (meth)acrylate); and at least one copolymerizable functional group-containing monomer selected from the group consisting of hydroxyl group-containing copolymerizable monomers, carboxyl group-containing copolymerizable monomers, and nitrogen-containing vinyl monomers. In the case where the at least one copolymerizable functional group-containing monomer includes a nitrogen-containing vinyl monomer, the mass ratio between the (meth)acrylate monomer and the nitrogen-containing vinyl monomer is e.g. between 95:5 and 50:50, between 95:5 and 55:45, between 95:5 and 60:40, between 90:10 and 50:50, between 90:10 and 55:45, between 90:10 and 60:40, between 85:15 and 50:50, between 85:15 and 55:45, between 85:15 and 60:40, between 80:20 and 50:50, between 80:20 and 55:45, between 80:20 and 60:40, between 75:25 and 50:50, between 75:25 and 55:45, or between 75:25 and 60:40, and preferably between 90:10 and 60:40.

The adhesive layer Ab is formed by curing a curable resin in an adhesive composition that contains a polymer and the curable resin. Then, with the adhesive composition layer being applied on the first principal face 12*s* of the optical sheet 10*a*, the curable resin in the adhesive composition is cured by applying heat or radiating active energy rays to the adhesive composition layer. From the standpoint of restraining the adhesive composition layer from entering into the plurality of dents, the curable resin (e.g., a UV-curable resin) preferably has a weight average molecular weight of 4000 or more, for example.

For example, the 23° C. initial tensile modulus of elasticity of the adhesive composition before curing the curable resin in the adhesive composition may be e.g. 0.35 MPa or more, 0.40 MPa or more, 0.45 MPa or more, or 0.50 MPa or more, and yet 8.00 MPa or less, 7.70 MPa or less, 7.50 MPa or less, 7.00 MPa or less, 6.50 MPa or less, 6.00 MPa or less, 5.50 MPa or less, 5.00 MPa or less, 4.50 MPa or less, 4.00 MPa or less, 3.50 MPa or less, or 3.00 MPa or less. The 23° C. initial tensile modulus of elasticity of the adhesive composition after curing the curable resin in the adhesive composition may be e.g. 1.00 MPa or more, 1.50 MPa or more, 2.00 MPa or more, 2.50 MPa or more, 3.00 MPa or more, 3.50 MPa or more, 4.00 MPa or more, 4.50 MPa or more, or 5.00 MPa or more. Although the upper limit of the 23° C. initial tensile modulus of elasticity of the adhesive composition after curing the curable resin in the adhesive composition is not particularly limited, it may be 1000 MPa or less, 800 MPa or less, 600 MPa or less, 400 MPa or less, or 200 MPa or less, for example. It is more preferable that the 23° C. initial tensile modulus of elasticity of the adhesive composition before curing the curable resin in the adhesive composition is 0.40 MPa or more and yet 7.70 MPa or less and the 23° C. initial tensile modulus of elasticity of the adhesive composition after curing the curable resin in the adhesive composition is 3.00 MPa or more.

The gel fraction before curing the curable resin in the adhesive composition is e.g. 75% or more, and the gel fraction after curing the curable resin in the adhesive composition is e.g. 90% or more. Although the upper limit of the gel fraction is not particularly limited, it may be 100%, for example.

(3) Adhesive Layer Ac

Japanese Patent Application No. 2021-025496 by the applicant describes an adhesive layer (which hereinafter may be referred to as "adhesive layer Ac") which is formed by cross-linking an adhesive composition containing: a polyester resin that is a copolymer of a polycarboxylic acid and a polyalcohol; a cross-linking agent; and at least one cross-linking catalyst selected from the group consisting of an organic zirconium compound, organic iron compound, and an organic aluminum compound, the adhesive layer having a gel fraction of 40% or more after being maintained at a temperature of 85° C. and a relative humidity of 85% for 300 hours, and having a 180° peel adhesive strength of 100 mN/20 mm or more with respect to a PMMA film. The adhesive layer Ac can also suppress change over time at a high temperature and a high humidity. The entire disclosure of Japanese Patent Application No. 2021-025496 is incorporated herein by reference.

As the adhesive forming the adhesive layer Aa or Ab, the following adhesives can be suitably used.

The adhesive contains a (meth)acrylic polymer, for example, where the (meth)acrylic polymer is a copolymer of a nitrogen-containing (meth)acrylic monomer and at least one other kind of monomer, for example. The nitrogen-containing (meth)acrylic monomer has a nitrogen-containing cyclic structure, for example. When a (meth)acrylic polymer is prepared by using a nitrogen-containing (meth) acrylic monomer, an effect of improving the elastic property of the (meth)acrylic polymer is obtained especially when the nitrogen-containing (meth)acrylic monomer has a nitrogen-containing cyclic structure.

In the case where the adhesive contains a (meth)acrylic polymer, the (meth)acrylic polymer is preferably cross-linked. In the case where the adhesive contains a (meth) acrylic polymer, the adhesive may further include an active energy ray-curable resin (e.g. a UV-curable resin) and a curing agent (e.g. a photopolymerization initiator), or may further contain a cured material of an active energy ray-curable resin. The active energy rays may be visible light and ultraviolet, for example. By introducing a cross-linked structure into the adhesive, deformation of the adhesive during attachment and its deformation over time are suppressed. In particular, by curing the active energy ray-curable resin after applying the adhesive composition layer (which becomes the adhesive layer 20*a*) to the optical sheet 10*a*, deformation of the adhesive layer 20*a* over time can be suppressed, and the change over time in the degree to which the adhesive layer 20*a* penetrates into the dents can be suppressed. When the active energy ray-curable resin is cured, the adhesive layer 20*a* becomes hard. If the adhesive layer 20*a* is too hard, it may be difficult to attach the adhesive layer 20*a* to the optical sheet 10*a* by a roll-to-roll method. However, this problem can be avoided if the active energy ray-curable resin is cured after the adhesive composition layer is applied to the optical sheet 10*a*.

An adhesive layer 20*a* containing a cured material of an active energy ray-curable resin is formed by the following method, for example. First, an adhesive composition solution layer is formed from an adhesive composition solution containing a (meth)acrylic polymer, a cross-linking agent, an active energy ray-curable resin, a polymerization initiator, and a solvent. The adhesive composition solution layer is formed, for example, on a release-treated principal face of a substrate. The solvent in the adhesive composition solution layer is then removed and the (meth)acrylic polymer in the adhesive composition solution layer is cross-linked by the cross-linking agent (e.g., by heating) to obtain an adhesive composition layer having a cross-linked structure. When the adhesive composition solution layer is formed on the release-treated principal face of the substrate, the adhesive composition layer becomes formed on the release-treated principal face of the substrate, whereby a multilayered body having the substrate and the adhesive composition layer is obtained. Now, the cross-linked structure that is formed of the (meth)acrylic polymer and the cross-linking agent will be referred to as the first cross-linked structure. This is to be distinguished from the cross-linked structure formed by curing the active energy ray-curable resin (second cross-linked structure), which will be described later. The polymer in the adhesive composition solution layer may be cross-linked in the step of removing the solvent in the adhesive composition solution layer; or, a further step of cross-linking the polymer in the adhesive composition solution layer may be performed after and separately from the step of removing the solvent in the adhesive composition solution layer. Thereafter, the adhesive composition layer is attached onto the first principal face 12*s* of the optical sheet 10*a*, and with the adhesive composition layer placed on the first principal face 12*s* of the optical sheet 10*a*, the adhesive composition layer is irradiated with active energy rays to cure the active energy ray-curable resin, whereby the adhesive layer 20*a* having the second cross-linked structure in addition to the first cross-linked structure can be formed. The first cross-linked structure and the second cross-linked structure possessed by the adhesive layer 20*a* can be considered as forming a so-called interpenetrating polymer network structure (IPN).

An adhesive layer 20*a* that does not contain a cured material of an active energy ray-curable resin is formed by the following method, for example. First, an adhesive composition solution layer is formed from an adhesive composition solution containing a polymer, a cross-linking agent and a solvent. This adhesive composition solution contains neither an active energy ray-curable resin nor a polymerization initiator. The adhesive composition solution layer is formed, for example, on the release-treated principal face of the substrate. The solvent in the adhesive composition solution layer is then removed and the polymer in the adhesive composition solution layer is cross-linked with a cross-linking agent (e.g., by heating) to obtain an adhesive layer 20*a* having a cross-linked structure. When the adhesive composition solution layer is formed on the release-treated principal face of the substrate, the adhesive layer becomes formed on the release-treated principal face of the substrate, whereby a multilayered body having a substrate and an adhesive layer is obtained. The polymer in the adhesive composition solution layer may be cross-linked in the step of removing the solvent in the adhesive composition solution layer; or, a further step of cross-linking the polymer in the adhesive composition solution layer may be performed after and separately from the step of removing the solvent in the adhesive composition solution layer.

Preferably, the adhesives does not contain any graft polymer. When formed from an adhesive composition containing graft polymers, as in the adhesive layer described in Patent Document 1, there are many design and control factors for the material, which may result in less mass producibility. Adhesives containing no graft polymer can have their creep characteristics adjusted by various factors (e.g., type and amount of cross-linking agent, type and amount of active ray-curable resin).

Suitable specific examples of the adhesive are described below.

The adhesive includes a (meth)acrylic polymer, for example. Without particular limitation, any (meth)acrylate can be used as a monomer for producing the (meth)acrylic polymer. For example, an alkyl (meth)acrylate having an alkyl group with 4 or more carbon atoms can be used. In this case, the ratio of the alkyl (meth)acrylate having an alkyl group with 4 or more carbon atoms to the total amount of monomer used in the production of the (meth)acrylic polymer is, for example, 50 mass % or more.

In the present specification, "alkyl (meth)acrylate" refers to any (meth)acrylate having straight or branched-chain alkyl groups. The number of carbon atoms in the alkyl group possessed by the alkyl (meth)acrylate is preferably 4 or more, and more preferably 4 or more and yet 9 or less. Note that (meth)acrylate refers to acrylates and/or methacrylates.

Specific examples of alkyl (meth)acrylates include n-butyl (meth)acrylate, sec-butyl (meth)acrylate, tert-butyl (meth)acrylate, isobutyl (meth)acrylate, n-pentyl (meth) acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth)acrylate, n-tetradecyl (meth)acrylate, stearyl (meth) acrylate, isostearyl (meth)acrylate, and the like. These can be used alone or in combination.

The adhesive may include a (meth)acrylic polymer that is a copolymer of a nitrogen-containing (meth)acrylic monomer and at least one other kind of monomer. In this case, the (meth)acrylic polymer is preferably a copolymer obtained by copolymerizing the following monomers in the following amounts, when the total amount of monomers used for copolymerization is 100 mass parts.

Nitrogen-containing (meth)acrylic monomer: 10.0 mass parts or more, 15.0 mass parts or more, 20.0 mass parts or more, 25.0 mass parts or more, 30.0 mass parts or more, or 35.0 mass parts or more, and yet 40.0 mass parts or less, 35.0 mass parts or less, 30.0 mass parts or less, 25.0 mass parts or less, 20.0 mass parts or less, or 15.0 mass parts or less. For example, 10.0 mass parts or more and yet 40.0 mass parts or less.

Hydroxyl group-containing acrylic monomer: 0.05 mass parts or more, 0.75 mass parts or more, 1.0 mass part or more, 2.0 mass parts or more, 3.0 mass parts or more, 4.0 mass parts or more, 5.0 mass parts or more, 6.0 mass parts or more, 7.0 mass parts or more, 8.0 mass parts or more, or 9.0 mass parts or more, and yet 10.0 mass parts or less, 9.0 mass parts or less, 8.0 mass parts or less, 7.0 mass parts or less, 6.0 mass parts or less, 5.0 mass parts or less, 4.0 mass parts or less, 3.0 mass parts or less, 2.0 mass parts or less, or 1.0 mass part or less. For example, 0.05 mass parts or more and yet 10.0 mass parts or less.

Carboxyl group-containing acrylic monomer: 1.0 mass part or more, 2.0 mass parts or more, 3.0 mass parts or more, 4.0 mass parts or more, 5.0 mass parts or more, 6.0 mass parts or more, 7.0 mass parts or more, 8.0 mass parts or more, or 9.0 mass parts or more, and yet 10.0 mass parts or less, 9.0 mass parts or less, 8.0 mass parts or less, 7.0 mass parts or less, 6.0 mass parts or less, 5.0 mass parts or less, 4.0 mass parts or less, 3.0 mass parts or less, or 2.0 mass parts or less. For example, 1.0 mass part or more and yet 10.0 mass parts or less.

Alkyl (meth)acrylate monomer: (100 mass parts)−(total amount of monomers other than alkyl (meth)acrylate monomer that are used for copolymerization). In the present specification, a "nitrogen-containing (meth)acrylic monomer" includes, without particular limitation, monomers which include a polymerizable functional group having an unsaturated double bond of (meth)acryloyl groups, and which include a nitrogen atom. A "nitrogen-containing (meth)acrylic monomer" has a nitrogen-containing cyclic structure, for example. Examples of nitrogen-containing (meth)acrylic monomers having a nitrogen-containing cyclic structure are N-vinyl-2-pyrrolidone (NVP), N-vinyl-ε-caprolactam (NVC), and 4-acryloyl morpholine (ACMO). These can be used alone or in combination.

In the present specification, a "hydroxyl group-containing acrylic monomer" includes, without particular limitation, monomers which include a polymerizable functional group having an unsaturated double bond of (meth)acryloyl groups, and which include a hydroxyl group. Examples thereof include: hydroxyalkyl (meth)acrylates, such as 2-hydroxybutyl (meth)acrylate, 2-hydroxypropyl (meth)acrylate, 3-hydroxypropyl (meth)acrylate, 4-hydroxybutyl (meth) acrylate, 6-hydroxyhexyl (meth)acrylate, 8-hydroxyoctyl (meth)acrylate, 10-hydroxydecyl (meth)acrylate, and 12-hydroxylauryl (meth)acrylate; 4-hydroxymethylcyclohexyl (meth)acrylate, 4-hydroxybutyl vinyl ether, and the like.

In the present specification, a "carboxyl group-containing acrylic monomer" includes, without particular limitation, monomers which include a polymerizable functional group having an unsaturated double bond of (meth)acryloyl groups or vinyl groups, etc., and which include a carboxyl group. Examples of unsaturated carboxylic acid-containing monomers are (meth)acrylic acid, carboxyethyl (meth)acrylate, carboxypentyl (meth)acrylate, itaconic acid, maleic acid, fumaric acid, crotonic acid, and the like. These can be used alone or in combination.

The adhesive may contain a (meth)acrylic polymer that is a copolymer of a carboxyl group-containing acrylic monomer and at least one other kind of monomer (except for nitrogen-containing (meth)acrylic monomers). In this case, the (meth)acrylic polymer is preferably a copolymer obtained by copolymerizing the following monomers in the following amounts, when the total amount of monomers used for copolymerization is 100 mass parts.

Carboxyl group-containing acrylic monomer: 1.0 mass part or more, 2.0 mass parts or more, 3.0 mass parts or more, 4.0 mass parts or more, 5.0 mass parts or more, 6.0 mass parts or more, 7.0 mass parts or more, 8.0 mass parts or more, or 9.0 mass parts or more, and yet 10.0 mass parts or less, 9.0 mass parts or less, 8.0 mass parts or less, 7.0 mass parts or less, 6.0 mass parts or less, 5.0 mass parts or less, 4.0 mass parts or less, 3.0 mass parts or less, or 2.0 mass parts or less. For example, 1.0 mass part or more and yet 10.0 mass parts or less.

Alkyl (meth)acrylate monomer: 90.0 mass parts or more, 91.0 mass parts or more, 92.0 mass parts or more, 93.0 mass parts or more, 94.0 mass parts or more, 95.0 mass parts or more, 96.0 mass parts or more, 97.0 mass parts or more, or 98.0 mass parts or more, and yet 99.0 mass parts or less, 98.0 mass parts or less, 97.0 mass parts or less, 96.0 mass parts or less, 95.0 mass parts or less, 94.0 mass parts or less, 93.0 mass parts or less, 92.0 mass parts or less, or 91.0 mass parts or less. For example, 90.0 mass parts or more and yet 99.0 mass parts or less.

Cross-linking agents for introducing a cross-linked structure to a (meth)acrylic polymer include cross-linking agents such as isocyanate-based cross-linking agents, epoxy-based cross-linking agents, silicone-based cross-linking agents, oxazoline-based cross-linking agents, aziridine-based cross-linking agents, silane-based cross-linking agents, alkyl-etherated melamine-based cross-linking agents, metal chelate-based cross-linking agents, and peroxides. Each cross-linking agent may be alone or two or more kinds may be used in combination.

An isocyanate-based cross-linking agent is meant to be a compound that includes two or more isocyanate groups (including isocyanate regenerative functional groups in which the isocyanate group is temporarily protected with a blocking agent or through oligomerization, etc.) within one molecule.

Isocyanate-based cross-linking agents include: aromatic isocyanates such as tolylene diisocyanate and xylene diisocyanate; alicyclic isocyanates such as isophorone diisocyanate; aliphatic isocyanates such as hexamethylene diisocyanate; and the like.

More specifically, examples may be: lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenylisocyanate; isocyanate adducts such as trimethylolpropane/tolylene diisocyanate trimer adduct (manufactured by Tosoh Corporation, product name: Coronate L), trimethylolpropane/hexamethylene diisocyanate trimer adduct (manufactured by Tosoh Corporation, product name: Coronate HL), isocyanurate of hexamethylene diisocyanate (manufactured by Tosoh Corporation, product name: Coronate HX); trimethylolpropane adduct of xylylene diisocyanate (manufactured by Mitsui Chemicals, Inc., product name: D110N), trimethylolpropane adduct of hexamethylene diisocyanate (manufactured by Mitsui Chemicals, Inc., product name: D160N); polyether polyisocyanate, polyester polyisocyanate, and adducts of these with various polyols, polyisocyanates polyfunctionalized with isocyanurate bonds, burette bonds, allophanate bonds, or the like, and so on.

Each isocyanate-based cross-linking agent may be used alone, or two or more of them may be used in a mixture. The blended amount of the isocyanate-based cross-linking agent(s) is, with respect to 100 mass parts of a (meth)acrylic polymer, e.g. 0.01 mass parts or more, 0.02 mass parts or more, 0.05 mass parts or more, or 0.1 mass parts or more, and yet 10 mass parts or less, 9 mass parts or less, 8 mass parts or less, 7 mass parts or less, 6 mass parts or less, or 5 mass parts or less, and preferably, 0.01 mass parts or more and yet 10 mass parts or less, 0.02 mass parts or more and yet 9 mass parts or less, or 0.05 mass parts or more and yet 8 mass parts or less. The blended amount may be adjusted appropriately in consideration of cohesion, inhibition of peeling in durability tests, and other factors.

In an aqueous dispersion solution of a modified (meth) acrylic polymer prepared by emulsion polymerization, it is not necessary to use an isocyanate-based cross-linking agent; if necessary, however, a blocked isocyanate-based cross-linking agent can be used because it reacts easily with water.

An epoxy-based cross-linking agent is a polyfunctional epoxy compound having two or more epoxy groups within one molecule. Examples of epoxy-based cross-linking agents are: bisphenol A, epichlorohydrin-type epoxy-based resins, ethylene glycidyl ether, N,N,N',N'-tetraglycidyl-m-xylenediamine, diglycidylaniline, diamine glycidylamine, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, glycerin diiglycidyl ether, glycerin triglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcinol diglycidyl ether, and bisphenol-S-diglycidyl ether, as well as epoxy-based resins having two or more epoxy groups within the molecule, etc. As epoxy-based cross-linking agents, for example, those manufactured by Mitsubishi Gas Chemical Company, Inc., product names: "Tetrad C", "Tetrad X", etc., can be used.

Each epoxy-based cross-linking agent may be used alone, or two or more of them may be used in a mixture. The blended amount of the epoxy-based cross-linking agent(s) is, with respect to 100 mass parts of a (meth)acrylic polymer, e.g. 0.01 mass parts or more, 0.02 mass parts or more, 0.05 mass parts or more, or 0.1 mass parts or more, and yet 10 mass parts or less, 9 mass parts or less, 8 mass parts or less, 7 mass parts or less, 6 mass parts or less, or 5 mass parts or less, and preferably, 0.01 mass parts or more and yet 10 mass parts or less, 0.02 mass parts or more and yet 9 mass parts or less, or 0.05 mass parts or more and yet 8 mass parts or less.

The blended amount may be adjusted appropriately in consideration of cohesion, inhibition of peeling in durability tests, and so on.

As a peroxide cross-linking agent, those which generate radical active species upon heating and promote cross-linking of the base polymer of the tackiness agent can be used as appropriate; in consideration of workability and stability, however, peroxides having a 1 minute half-life temperature of not less than 80° C. and not more than 160° C. are preferably used, and peroxides having a 1 minute half-life temperature of not less than 90° C. and not more than 140° C. are more preferably used.

As the peroxide, for example, di(2-ethylhexyl)peroxydicarbonate (1 minute half-life temperature: 90.6° C.), di(4-t-butylcyclohexyl)peroxydicarbonate (1 minute half-life temperature: 92.1° C.), di-sec-butylperoxydicarbonate (1 minute half-life temperature: 92.4° C.), t-butyl peroxyneodecanoate (1 minute half-life temperature: 103.5° C.), t-hexylperoxypivalate (1 minute half-life temperature: 109.1° C.), t-butylperoxypivalate (1 minute half-life temperature: 110.3° C.), dilauroyl peroxide (1 minute half-life temperature: 116.4° C.), di-n-octanoyl peroxide (1 minute half-life temperature: 117.4° C.), 1,1,3,3-tetramethylbutylperoxy-2-ethylhexanoate (1 minute half-life temperature: 124.3° C.), di(4-methylbenzoyl) peroxide (1 minute half-life temperature: 128.2° C.), dibenzoyl peroxide (1 minute half-life temperature: 130.0° C.), t-butyl peroxyisobutylate (1 minute half-life temperature: 136.1° C.), 1,1-di(t-hexylperoxy) cyclohexane (1 minute half-life temperature: 149.2° C.), and the like. Among others, di(4-t-butylcyclohexyl) peroxydicarbonate (1 minute half-life temperature: 92.1° C.), dilauroyl peroxide (1 minute half-life temperature: 116.4° C.), dibenzoyl peroxide (1 minute half-life temperature: 130.0° C.), and the like are preferably used because of their particularly outstanding cross-linking reaction efficiencies.

The half-life of a peroxide is an index of the decomposition rate of the peroxide, and refers to the time required for the remaining amount of peroxide to be reduced to half. The decomposition temperature for achieving a half-life in a given period of time, and the half-life time at a given temperature, are described in manufacturers' catalogs, for example, "Organic Peroxides Catalog 9th Edition (May 2003)" by NOF CORPORATION.

Each peroxide may be used alone, or two or more of them may be used in a mixture. The blended amount of the peroxide is, with respect to 100 mass parts of a (meth)acrylic polymer, 0.02 mass parts or more and yet 2 mass parts or less, and preferably 0.05 mass parts or more and yet 1 mass part or less. It is to be appropriately adjusted within this range for adjusting processibility, reworkability, cross-linking stability, and releasability.

The amount of decomposition of the peroxide remaining after the reaction treatment can be measured by HPLC (high performance liquid chromatography) or other methods, for example.

More specifically, for example, the tackiness agent after the reaction treatment may be taken in about 0.2 g aliquots, immersed in 10 ml of ethyl acetate and extracted by shaking for 3 hours at 120 rpm under 25° C. in a shaking machine, and left at room temperature for 3 days. Then, 10 ml of acetonitrile may be added, and a liquid extract obtained by shaking at 120 rpm for 30 minutes at 25° C. and filtered through a membrane filter (0.45 μm) may be injected in HPLC, and analyzed to determine the amount of peroxide after the reaction treatment.

Organic cross-linking agents and polyfunctional metal chelates may also be used as cross-linking agents. A polyfunctional metal chelate is a polyvalent metal covalently or coordinately bonded to an organic compound. The polyvalent metal atoms include Al, Cr, Zr, Co, Cu, Fe, Ni, V, Zn, In, Ca, Mg, Mn, Y, Ce, Sr, Ba, Mo, La, Sn, Ti, and so on. Examples of atoms in the organic compound to which to covalently or coordinately bonded are oxygen atoms; and examples of organic compounds are alkyl esters, alcohol compounds, carboxylic acid compounds, ether compounds, and ketone compounds.

The blended amount of active energy ray-curable resin is e.g. 3 mass parts or more and yet 60 mass parts or less with respect to 100 mass parts of a (meth)acrylic polymer. The weight average molecular weight (Mw) before curing is not less than 4000 and not more than 50000. For example, acrylate-based, epoxy-based, urethane-based, or en-thiol-based UV-curable resins can be suitably used as the active energy ray-curable resin.

As the active energy ray-curable resin, monomers and/or oligomers that undergo radical polymerization or cationic polymerization with active energy rays are used.

Examples of monomers that undergo radical polymerization by active energy rays are monomers having unsaturated double bonds such as (meth)acryloyl groups and vinyl groups, and monomers having (meth)acryloyl groups are especially preferably used due to their good reactivity.

Specific examples of monomers having (meth)acryloyl groups are allyl (meth)acrylate, caprolactone (meth)acrylate, cyclohexyl (meth)acrylate, N,N-diethylaminoethyl (meth) acrylate, 2-ethylhexyl (meth)acrylate, heptadecafluorodecyl (meth)acrylate, glycidyl (meth)acrylate, caprolactone modified 2-hydroxylethyl (meth)acrylate, isobornyl (meth)acrylate, morpholine (meth)acrylate, (meth)acrylate, phenoxy ethyl (meth)acrylate, tripropylene glycol di(meth)acrylate, bisphenol A diglycidyl ether di(meth)acrylate, neopentyl glycol hydroxypivalate di(meth)acrylate, trimethylolpropane tri(meth)acrylate, trimethylolpropane ethoxy tri(meth) acrylate, pentaerythritol tri(meth)acrylate, pentaerythritol tetra(meth)acrylate, dipentaerythritol penta(meth)acrylate, dipentaerythritol hexa(meth)acrylate, caprolactone modified dipentaerythritol hexa (meth)acrylate, and the like.

As oligomers to undergo radical polymerization by active energy rays, polyester (meth)acrylate, epoxy (meth)acrylate, urethane (meth)acrylate, etc., to which two or more unsaturated double bonds, such as (meth)acryloyl groups or vinyl groups, are added as functional groups similar to those of monomers to the polyester, epoxy, urethane, etc. skeleton, are used.

Polyester (meth)acrylate is obtained by allowing a polyester with a terminal hydroxyl group obtained from a polyalcohol and a polycarboxylic acid to react with (meth) acrylic acid. Specific examples include the Aronix M-6000, 7000, 8000, and 9000 series manufactured by TOAGOSEI CO., LTD.

Epoxy (meth)acrylate is obtained by allowing an epoxy resin to react with (meth)acrylic acid. Specific examples are Ripoxy SP, VR series manufacture by Showa Polymer Co. and Epoxy Ester series manufactured by Kyoeisha Chemical Co.

Urethane (meth)acrylate is obtained by allowing polyol, isocyanate, and hydroxy (meth)acrylate to react. Specific examples are Artresin UN series made by Negami Chemical Industrial Co., Ltd., Shin Nakamura Chemical Co. NK Oligo U series, Shikoh UV series made by Mitsubishi Chemical Corporation, and others.

Through ultraviolet irradiation, a photopolymerization initiator is excited and activated to generate radicals, and acts to cure polyfunctional oligomers via radical polymerization. Examples are: acetophenone-based photopolymerization initiators, such as 4-phenoxydichloroacetophenone, 4-t-butyldichloroacetophenone, diethoxyacetophenone, 2-hydroxy-2-methyl-1-phenylpropane-1-one, 1-(4-isopropylphenyl)-2-hydroxy-2-methylpropane-1-one, 1-(4-dodecylphenyl)-2-hydroxy-2-methylpropane-1-one, 4-(2-hydroxyethoxy)phenyl (2-hydroxy-2-propyl)ketone, and 1-hydroxycyclohexylphenyl ketone, 2-methyl-1-[4-(methylthio)phenyl]-2-morpholinopropane-1; benzoin-based photopolymerization initiators, such as benzoin, benzoin methyl ether, benzoin ethyl ether, benzoin isopropyl ether, benzoin isobutyl ether, and 2,2-dimethoxy-2-phenylacetophenone; benzophenone-based photopolymerization initiators, such as benzophenone, benzoyl benzoate, methyl benzoyl benzoate, 4-phenyl benzophenone, hydroxy benzophenone, 4-benzoyl-4'-methyldiphenylsulfide, and 3,3'-dimethyl-4-methoxybenzophenone; thioxanthone-based photopolymerization initiators, such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone; and specialized photopolymerization initiators, such as α-acyloxime esters, acylphosphine oxide, methylphenylglyoxylate, benzyl, camphorquinone, dibenzosuberone, and 2-ethylanthraquinone, 4',4"-diethylisophthalophenone. As the photopolymerization initiator, photocationic polymerization initiators can also be used, such as allylsulfonium hexafluorophosphate salts, sulfonium hexafluorophosphate salts, and bix(alkylphenyl) iodonium hexafluorophosphate.

Two or more of the above photopolymerization initiators can be used in combination. The polymerization initiator is usually blended in the range of 0.5 mass parts or more and yet 30 mass parts or less, and preferably in the range of 1 mass part or more and yet 20 mass parts or less, for 100 mass parts of the above active energy ray-curable resin. If less than 0.5 mass parts, polymerization does not progress sufficiently and the rate of curing may become slow; if more than 30 mass parts, the hardness of the cured sheet may decrease, or other problems may occur.

Active energy rays are not particularly limited, but preferably are ultraviolet, visible light, and electron beams. Cross-linking treatment by UV irradiation can be performed using an appropriate ultraviolet source such as high-pressure mercury lamps, low-pressure mercury lamps, excimer lasers, metal halide lamps, and LED lamps. The ultraviolet irradiation dose can be selected according to the required degree of cross-linking, but usually, in the case of ultraviolet, it is desirably chosen in the range of not less than 0.2 $J/cm^2$ and not more than 10 $J/cm^2$. The temperature during irradiation is not particularly limited, but it is preferably up to about 140° C. in terms of heat resistance of the supporting body.

When the adhesive contains a polyester-based polymer instead of or in addition to a (meth)acrylic polymer, the polyester-based polymer preferably has the following characteristics, for example.

Types of carboxylic acid component (or skeletal features, etc.): containing dicarboxylic acid including at least two carboxyl groups, specifically, dicarboxylic acids, where examples of the dicarboxylic acid are, although not particularly limited, dimer acids which are derived from sebacic acid, oleic acid, erucic acid, or the like. Other examples are glutaric acid, suberic acid, adipic acid, azelaic acid, 1,4-cyclohexane dicarboxylic acid, 4-methyl-1,2-cyclohexane dicarboxylic acid, dodecenylsuccinic anhydride, fumaric acid, succinic acid, dodecanedioic acid, hexahydrophthalic anhydride, tetrahydrophthalic anhydride, maleic acid, maleic anhydride, itaconic acid, citraconic acid, or other aliphatic or alicyclic dicarboxylic acids, terephthalic acid, isophthalic acid, orthophthalic acid, 1,5-naphthalene dicarboxylic acid, 2,6-naphthalene dicarboxylic acid, 4,4'-diphenyldicarboxylic acid, 2,2'-diphenyldicarboxylic acid, and 4,4'-diphenyl ether dicarboxylic acid. In addition to the aforementioned dicarboxylic acids, tricarboxylic acids containing three or more carboxyl groups can also be used.

Type of diol component (or skeletal features, etc.): containing those including at least two hydroxyl groups within the molecule, specifically, diols. Dimer diols derived from fatty esters, oleic acid, erucic acid, etc., glycerol monostearate, or the like. Other examples are: aliphatic glycols such as ethylene glycol, and 1,2-propylene glycol; and, among non-aliphatic glycols, ethylene oxide adducts and propylene oxide adducts of bisphenol A, ethylene oxide adducts and propylene oxide adducts of hydrogenated bisphenol A.

As cross-linking agents for introducing a cross-linked structure to a polyester-based polymer, isocyanate-based cross-linking agents, oxazoline-based cross-linking agents, aziridine-based cross-linking agents, silane-based cross-linking agents, alkyl-etherated melamine-based cross-linking agents, and metal chelate-based cross-linking agents can be used. Their blended amount is e.g. 2.0 mass parts or more and yet 10.0 mass parts or less with respect to 100 mass parts of a polyester-based polymer.

Specific examples of the composition of adhesive layer Ac are described below.

<Polycarboxylic Acid>

Examples of polycarboxylic acids include:

- aromatic dicarboxylic acids, such as terephthalic acid, isophthalic acid, benzylmalonic acid, diphenic acid, 4,4'-oxydibenzoic acid, and naphthalene dicarboxylic acid;
- aliphatic dicarboxylic acids, such as malonic acid, dimethyl malonic acid, succinic acid, glutaric acid, adipic acid, trimethyl adipic acid, pimelic acid, 2,2-dimethyl glutaric acid, azelaic acid, sebacic acid, fumaric acid, maleic acid, itaconic acid, thiodipropionic acid, and diglycolic acid; and
- alicyclic dicarboxylic acids, such as 1,3-cyclopentane dicarboxylic acid, 1,2-cyclohexane dicarboxylic acid, 1,3-cyclopentane dicarboxylic acid, 1,4-cyclohexane dicarboxylic acid, 2,5-norbornane dicarboxylic acid, and adamantane dicarboxylic acid.

These may be used each alone, or two or more of them may be used in combination.

Among others, from the standpoint of conferring cohesion, they preferably contain aromatic dicarboxylic acids, and especially preferably contain terephthalic acid or isophthalic acid.

<Polyalcohol>

Examples of polyalcohols include:

- aliphatic diols, such as ethylene glycol, diethylene glycol, triethylene glycol, propylene glycol, dipropylene glycol, 1,3-propanediol, 2,4-dimethyl-2-ethylhexane-1,3-diol, 2-methyl-1,3-propanediol, 2,2-dimethyl-1,3-propanediol(neopentylglycol), 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 3-methyl-1,5-pentanediol, 2,2,4-trimethyl-1,6-hexanediol, and polytetramethylene glycol;
- alicyclic diols, such as 1,2-cyclohexane dimethanol, 1,3-cyclohexane dimethanol, 1,4-cyclohexane dimethanol, spiroglycol, tricyclodecane dimethanol, adamantane diol, and 2,2,4,4-tetramethyl-1,3-cyclobutanediol; and
- aromatic diols, such as 4,4'-thiodiphenol, 4,4'-methylenediphenol, 4,4'-dihydroxybiphenyl, o-, m- and p-dihydroxybenzenes, 2,5-naphthalene diol, p-xylene diol, and ethylene oxides thereof, and propylene oxide adducts.

These may be used each alone, or two or more of them may be used in combination.

Among others, they preferably contain aliphatic diols or alicyclic diols, and more preferably polytetramethylene glycol, neopentylglycol, or cyclohexane dimethanol.

<Cross-Linking Agent>

As the cross-linking agent, without any particular limitation, those which are known can be used, e.g., polyvalent isocyanurates, polyfunctional isocyanates, polyfunctional melamine compounds, polyfunctional epoxy compounds, polyfunctional oxazoline compounds, polyfunctional aziridine compounds, and metal chelate compounds. In particular, from the standpoints of transparency of the resultant adhesive layer and achieving an elastic modulus that is suitable as an adhesive layer, an isocyanate-based cross-linking agent is preferably used.

An isocyanate-based cross-linking agent is meant to be a compound that includes two or more isocyanate groups (including isocyanate regenerative functional groups in which the isocyanate group is temporarily protected with a blocking agent or through oligomerization, etc.) within one molecule.

Isocyanate-based cross-linking agents include: aromatic isocyanates such as tolylene diisocyanate and xylene diisocyanate; alicyclic isocyanates such as isophorone diisocyanate; aliphatic isocyanates such as hexamethylene diisocyanate; and the like.

More specifically, examples may be: lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenylisocyanate; isocyanate adducts such as trimethylolpropane/tolylene diisocyanate trimer adduct (manufactured by Tosoh Corporation, product name: Coronate L), trimethylolpropane/hexamethylene diisocyanate trimer adduct (manufactured by Tosoh Corporation, product name: Coronate HL), isocyanurate of hexamethylene diisocyanate (manufactured by Tosoh Corporation, product name: Coronate HX); trimethylolpropane adduct of xylylene diisocyanate (manufactured by Mitsui Chemicals, Inc., product name: D110N), trimethylolpropane adduct of hexamethylene diisocyanate (manufactured by Mitsui Chemicals, Inc., product name: D160N); polyether polyisocyanate, polyester polyisocyanate, and adducts of these with various polyols, polyisocyanates polyfunctionalized with isocyanurate bonds, biuret bonds, allophanate bonds, or the like, and so on. Use of aliphatic isocyanates is more preferable because an adhesive layer having a high gel fraction can be obtained with a small amount of cross-linking agent.

Each isocyanate-based cross-linking agent may be used alone, or two or more of them may be used in a mixture. The lower limit of the blended amount of the isocyanate-based cross-linking agent is, with respect to 100 mass parts of polyester resin, 6 mass parts or more, preferably 7 mass parts or more, 8 mass parts or more, 9 mass parts or more, or 10 mass parts or more, whereas the upper limit of the blended amount of the isocyanate-based cross-linking agent is 20 mass parts or less, and preferably 15 mass parts or less. These ranges allow for restraining the adhesive layer from penetrating into the dents of the concavo-convex structure over time, while providing a good adhesive strength with respect to a surface having a concavo-convex structure.

<Cross-Linking Catalyst>

Examples of organic aluminum compounds include aluminum trisacetylacetonate, and aluminum trisethylacetoacetate, diisopropoxyaluminum ethylacetoacetate.

Examples of organic iron compounds include acetylacetone-iron complexes.

Examples of organic zirconium compounds include zirconium tetraacetylacetonate.

These may be used each alone, or two or more of them may be used in combination as necessary.

Use of a cross-linking catalyst can increase the cross-linking rate and reduce the production lead time.

As the method of forming adhesive layer Ac, known methods can be adopted. For example, the following method is possible. First, an adhesive composition (or a solution containing an adhesive composition) is introduced (applied) onto a supporting body (substrate), and dried as necessary, thereby forming an adhesive composition layer. Typically, an adhesive composition solution containing a polyester resin, a cross-linking agent, a cross-linking catalyst, and a solvent is applied onto the substrate, thereby forming an adhesive composition solution layer on the substrate; and then the solvent in the adhesive composition solution layer is removed to obtain an adhesive composition layer. Next, the adhesive composition layer is subjected to a cross-linking treatment (e.g., a heat treatment), thereby allowing the polyester resin in the adhesive composition layer to be cross-linked by the cross-linking agent, whereby an adhesive layer having a cross-linked structure is formed. In this manner, the adhesive layer is formed on the substrate, whereby a multilayered body having the substrate and the adhesive layer is obtained. As the substrate, for example, a substrate having release-treated principal face, e.g., a release liner, may be used. An adhesive layer that is formed on a release liner by the aforementioned method may be moved (transferred) onto a supporting body (or another release liner). Known methods can be adopted as the method of applying the adhesive composition (adhesive composition solution) onto the substrate. Examples thereof include roll coating, gravure coating, reverse roll coating, roll brush coating, air knife coating, spray coating, extrusion coating with a die coater, and so on.

[Examples of Preferable Configurations of Lightguide Layer, Optical Sheet, Substrate Layer, and Low-Refractive Index Layer]

Preferable examples of component elements of an illumination device according to an embodiment of the present invention will be described.

The lightguide layer 80 may be made of a known material having a high transmittance with respect to visible light. The lightguide layer 80 is made of an acrylic resin such as polymethyl methacrylate (PMMA), a polycarbonate (PC)-based resin, a cycloolefin-based resin, or glass (e.g., quartz glass, non-alkaline glass, borosilicate glass), for example. The refractive index $n_{GP}$ of the lightguide layer 80 is e.g. not less than 1.40 and not more than 1.80. Unless otherwise specified, the refractive index refers to a refractive index that is measured with an ellipsometer at a wavelength of 550 nm. The thickness of the lightguide layer 80 can be appropriately set depending on the application. The thickness of the lightguide layer 80 is e.g. not less than 0.05 mm and not more than 50 mm.

The first optical sheet 10*a* can be produced by a method described in Japanese National Phase PCT Laid-Open Publication No. 2013-524288, for example. Specifically, for example, the surface of a polymethyl methacrylate (PMMA) film was coated with a lacquer (e.g., manufactured by Sanyo Chemical Co., FINECURE RM-64: an acrylate photocurable resin); an optical pattern was embossed on the film surface including the lacquer; and thereafter the lacquer was cured (e.g., ultraviolet irradiation condition: D bulb, 1000 $mJ/cm^2$, 320 $mW/cm^2$) to produce the first optical sheet 10*a*.

The material of the second optical sheet 30 may for example be a light-transmitting thermoplastic resin, and more specifically a film made of a (meth)acrylic resin such as polymethyl methacrylate (PMMA), or a polycarbonate (PC)-based resin or the like. Depending on the purpose, any suitable material may be adopted for the second optical sheet 30.

The thickness of the substrate layer is e.g. not less than 1 μm and not more than 1000 μm, preferably not less than 10 μm and not more than 100 μm, and still more preferably not less than 20 μm and not more than 80 μm. The refractive index of the substrate layer is preferably not less than 1.40 and not more than 1.70, and still more preferably not less than 1.43 and not more than 1.65.

The refractive index $n_{L1}$ of the low-refractive index layer is, each independently, preferably e.g. 1.30 or less, more preferably 1.20 or less, and still more preferably 1.15 or less. The low-refractive index layer is preferably a solid, preferably having a refractive index of e.g. 1.05 or more. The difference between the refractive index of the lightguide layer 80 and the refractive index of the low-refractive index layer is preferably 0.20 or more, more preferably 0.23 or more, and still more preferably 0.25 or more. A low-refractive index layer having a refractive index of 1.30 or less can be formed by using a porous material, for example. The thickness of the low-refractive index layer is, each independently, e.g. not less than 0.3 μm and not more than 5 μm.

When the low-refractive index layer is a porous material with internal voids, its porosity is preferably 35 volume % or more, more preferably 38 volume % or more, and especially preferably 40 volume % or more. Within such ranges, a low-refractive index layer having a particularly low refractive index can be formed. The upper limit of the porosity of the low-refractive index layer is e.g. 90 volume % or less, and preferably 75 volume % or less. Within such ranges, a low-refractive index layer with good strength can be formed. The porosity is a value that is calculated according to Lorentz-Lorenz's formula from a value of the refractive index measured with an ellipsometer.

As the low-refractive index layer, for example, a low-refractive index layer with voids as disclosed in International Publication No. 2019/146628 can be used. The entire disclosure of International Publication No. 2019/146628 is incorporated herein by reference. Specifically, low-refractive index layers with voids include: essentially spherical particles such as silica particles, silica particles having micropores, and silica hollow nanoparticles; fibrous particles such as cellulose nanofibers, alumina nanofibers, and silica nanofibers; and flat-plate particles such as nanoclay composed of bentonite. In one embodiment, the low-refractive index layer with voids is a porous material composed of particles (e.g., micropored particles) that are chemically bonded directly to one another. The particles composing the low-refractive index layer with voids may be at least partially bonded to one another via a small amount (e.g., less than the mass of the particles) of a binder component. The porosity and refractive index of the low-refractive index layer can be adjusted based on the particle size, particle size distribution, and the like of the particles composing the low-refractive index layer.

Examples of methods of obtaining a low-refractive index layer with voids include methods that are described in Japanese Laid-Open Patent Publication No. 2010-189212, Japanese Laid-Open Patent Publication No. 2008-040171, Japanese Laid-Open Patent Publication No. 2006-011175, International Publication No. 2004/113966, and references thereof. The entire disclosure of Japanese Laid-Open Patent Publication No. 2010-189212, Japanese Laid-Open Patent Publication No. 2008-040171, Japanese Laid-Open Patent Publication No. 2006-011175, International Publication No. 2004/113966 is incorporated herein by reference.

As the low-refractive index layer with voids, porous silica can be suitably used. Porous silica can be produced by the following method, for example: a method involving hydrolyzing and polycondensing at least one of silicon compounds, hydrolyzable silanes and/or silsesquioxanes, and their partial hydrolysates and dehydration-condensation products; a method that uses porous particles and/or hollow microparticles; and a method that generates an aerogel layer using the springback phenomenon, a method of pulverizing a gelatinous silicon compound obtained by sol-gel processing and using a pulverized gel in which micropored particles as the resultant pulverized body are chemically bonded to one another with a catalyst or the like; and so on. However, the low-refractive index layer is not limited to porous silica, and the production method is not limited to the exemplified production methods; any production method may be used for production. Silsesquioxane is a silicon compound with ($RSiO_{1.5}$; where R is a hydrocarbon group) as the basic structural unit. Although silsesquioxane is not exactly the same as silica, whose basic structural unit is $SiO_2$, it has a network structure cross-linked by siloxane bonds, similarly to silica. Therefore, any porous material that contains silsesquioxane as its basic structural unit is also referred to as porous silica or silica-based porous material.

Porous silica may be composed of micropored particles of a gelatinous silicon compound that are bonded to one another. An example of micropored particles of a gelatinous silicon compound is a pulverized body of the gelatinous silicon compound. Porous silica may be formed by coating a base with a coating solution that contains a pulverized body of a gelatinous silicon compound, for example. The pulverized body of the gelatinous silicon compound may chemically bonded (e.g., siloxane bonded) through catalytic action, light irradiation, heating, or the like, for example.

EXAMPLE

Manufacturing Example 1

Production of Concavo-Convex Textured Film

A concavo-convex textured film was produced according to a method described in Japanese National Phase PCT Laid-Open Publication No. 2013-524288. Specifically, the surface of a polymethyl methacrylate (PMMA) film was coated with a lacquer (manufactured by Sanyo Chemical Co., FINECURE RM-64); an optical pattern was embossed on the film surface including the lacquer; and thereafter the lacquer was cured to produce the concavo-convex textured film of interest. The concavo-convex textured film had a total thickness of 125 μm, and a haze value of 0.8%.

FIG. 8A shows a plan view of a portion of the resultant concavo-convex textured film as viewed from the concavo-convex surface side. FIG. 8B shows a cross-sectional view of the concavo-convex textured film at 8B-8B' in FIG. 8A. A plurality of dents 74 having a length L of 80 μm, a width W of 17.3 μm, and a depth H of 10 μm and having a triangular cross-section are disposed at intervals of E (260 μm) along the X axis direction. Furthermore, patterns of such dents 74 are disposed at intervals of D (160 μm) along the Y axis direction. In FIG. 8A, Px is 340 μm, and Py is 174 μm. The dents 74 had a density of 2426/$cm^2$ on the surface of the concavo-convex textured film. In FIG. 8B, the inclination angle $\theta a$ was about 60°, and the inclination angle $\theta b$ was 85°. The dents 74 had an occupied area percentage of 3.4% in a plan view of the film as seen from the concavo-convex surface side.

Manufacturing Example 2

Production of Polyester Adhesive Sheet (1) Preparation of Polyester Resin A

An agitator, a thermometer, a nitrogen inlet tube, and a cooling tube with a trap were attached to a four-necked separable flask. In this flask, 47 g of terephthalic acid (molecular weight: 166) and 45 g of isophthalic acid (molecular weight: 166) as carboxylic acid components, 115 g of polytetramethylene glycol (molecular weight: 566), 4 g of ethylene glycol (molecular weight: 62), 16 g of neopentylglycol (molecular weight: 104), and 23 g of cyclohexane dimethanol (molecular weight: 144) as alcohol components, and 0.1 g of tetrabutyltitanate as a catalyst were placed.

While the inside of the flask was filled with a nitrogen gas, with stirring, the temperature was elevated to 240° C., and maintained at 240° C. for 4 hours.

Thereafter, the nitrogen inlet tube and the cooling tube with a trap were removed, and a vacuum pump was installed instead, and, during stirring in a reduced pressure ambient (0.002 MPa), the temperature was elevated to 240° C. and maintained at 240° C. The reaction was continued for about 6 hours, whereby polyester resin A was obtained. Polyester resin A was obtained by polymerizing the aforementioned monomer without using a solvent. In a GPC measurement, polyester resin A had a weight average molecular weight (Mw) of 59,200. While dissolving in ethyl acetate, the prepared polyester resin A was taken out of the flask, thus preparing a polyester resin A solution having a solid concentration of 50 mass %.

(2) Preparation of Adhesive Composition Solution

To 100 mass parts in solid content of the polyester resin A solution prepared as above, 0.07 mass parts of zirconium tetraacetylacetonate (product name "Orgatix ZC-162", manufactured by Matsumoto Fine Chemical Co., Ltd.; "Orgatix" is a registered trademark; hereinafter may be referred to as "ZC-162") as a cross-linking catalyst, 12 mass parts of isocyanurate of hexamethylene diisocyanate (product name "Coronate HX", manufactured by Tosoh Corporation; "Coronate" is a registered trademark; hereinafter may be referred to as "Coronate HX") as a cross-linking agent, and 20 mass parts of acetylacetone as a catalytic reaction inhibitor were blended; to this, ethyl acetate was further added to result in a solid concentration of 20 mass %, thus preparing an adhesive composition solution.

(3) Production of Adhesive Sheet

On one side of a polyethylene terephthalate (PET) film (product name: "MRF38", manufactured by Mitsubishi Chemical Corporation) having a thickness of 38 μm and having been silicone release-treated, the adhesive composition solution was applied to form an adhesive composition solution layer. The application of the adhesive composition solution layer was performed so that the adhesive layer had a thickness of 7 μm after the below-described treatment step at 40° C. for 3 days. By drying the adhesive composition solution layer at 150° C. for 1 minute, the solvent in the adhesive composition solution layer was removed, whereby an adhesive composition layer was obtained. Next, the adhesive composition layer was attached onto a release-treated surface of a 38 μm polyethylene terephthalate (PET) film (product name: "MRE38", manufactured by Mitsubishi Chemical Corporation) having been silicone release-treated, and this was left at 40° C. for 3 days. By treating the adhesive composition layer at 40° C. for 3 days, the polyester resin A in the adhesive composition layer was cross-linked by the cross-linking agent, thus forming an adhesive layer. In this manner, an adhesive sheet (multilayered body) having a layered structure of PET film/adhesive layer/PET film was produced. Although the cross-linking reaction of polyester resin A may partially occur also in the step of treating the adhesive composition solution layer at 150° C. for 1 minute, a large part of the cross-linking reaction occurs in the subsequent step of heat treatment at 40° C. for 3 days.

Manufacturing Example 3

Production of Acrylic Adhesive Sheet (1) Preparation of Adhesive Composition Solution First, an acrylic polymer was prepared. By using a four-necked flask equipped with stirring blades, a thermometer, a nitrogen gas inlet tube, and a condenser, 74.6 mass parts of n-butyl acrylate (BA), 18.6 mass parts of 4-acryloyl morpholine (ACMO), 6.5 mass parts of acrylic acid (AA), 0.3 mass parts of 4-hydroxybutyl acrylate (4HBA), and 0.1 mass parts of 2,2'-azobisisobutyronitrile as a polymerization initiator were placed in the flask together with ethyl acetate, so that the total of monomers was 50 mass %. After nitrogen replacement for 1 hour by introducing nitrogen gas with gentle stirring, the liquid temperature in the flask was kept at around 58° C. and the polymerization reaction was carried out for 8 hours, whereby an acrylic polymer was obtained. After 2 hours had elapsed from the start of the polymerization reaction, ethyl acetate was added dropwise over 3 hours to bring the solid content to 35 mass %. In other words, the acrylic polymer was obtained as an acrylic polymer solution with a solid content of 35 mass %.

Then, in the resultant acrylic polymer solution, with respect to 100 mass parts of the polymer, 10 mass parts in solid content of a UV-curable urethane acrylate resin A (weight average molecular weight Mw: 5,500), 1.0 mass part of 2-hydroxy-4'-(2-hydroxyethoxy)-2-methylpropionphenone (product name: "Omnirad2959", manufactured by IGM Japan, Inc.) as a photopolymerization initiator, and 0.6 mass parts of 1,3-bis(N,N-diglycidylaminomethyl) cyclohexane (product name: "TETRAD-C", manufactured by Mitsubishi Gas Chemical Company, Inc.; hereinafter may be referred to as "TETRAD-C") as a cross-linking agent were blended, thereby preparing an adhesive composition solution.

(2) Production of Adhesive Sheet

On one side of a polyethylene terephthalate (PET) film (product name: "MRF38", manufactured by Mitsubishi Chemical Corporation) having a thickness of 38 μm and having been silicone release-treated, an adhesive composition solution was applied to form an adhesive composition solution layer. The application was performed so that the adhesive composition solution layer had a thickness after drying (i.e., thickness of the adhesive composition layer) of 7 μm. By drying the adhesive composition solution layer at 140° C. for 3 minutes, the solvent in the adhesive composition solution layer was removed, and the acrylic polymer was cross-linked by the cross-linking agent, whereby an adhesive composition layer having the first cross-linked structure was obtained. Next, the adhesive composition layer was attached onto a release-treated surface of a polyethylene terephthalate (PET) film (product name: "MRE38", manufactured by Mitsubishi Chemical Corporation) having a thickness of 38 μm and having been silicone release-treated, thereby producing an adhesive sheet having a layered structure of PET film/adhesive composition layer/PET film.

Manufacturing Example 4

(1) Preparation of Polyester Resin A

This was performed similarly to Manufacturing Example 2.

(2) Preparation of Adhesive Composition Solution

To 100 mass parts in solid content of the polyester resin A solution prepared as above, 0.33 mass parts of zirconium tetraacetylacetonate (product name "Orgatix ZC-162", manufactured by Matsumoto Fine Chemical Co., Ltd.) as a cross-linking catalyst, 12 mass parts of isocyanurate of hexamethylene diisocyanate (product name "Coronate HX", manufactured by Tosoh Corporation) as a cross-linking agent, and 20 mass parts of acetylacetone as a catalytic reaction inhibitor were blended; to this, ethyl acetate was further added to result in a solid concentration of 20 mass %, thus preparing an adhesive composition solution.

(3) Production of Adhesive Sheet

On one side of a polyethylene terephthalate (PET) film (product name: "MRF38", manufactured by Mitsubishi Chemical Corporation) having a thickness of 38 μm and having been silicone release-treated, the adhesive composition solution was applied to form an adhesive composition solution layer. The application of the adhesive composition solution layer was performed so that the adhesive layer had a thickness of 7 μm after drying. By drying the adhesive composition solution layer at 100° C. for 1 minute, the solvent in the adhesive composition solution layer was removed, whereby an adhesive layer was obtained. Next, the adhesive layer was attached onto a release-treated surface of a 38 μm polyethylene terephthalate (PET) film (product name: "MRE38", manufactured by Mitsubishi Chemical Corporation) having been silicone release-treated, thereby producing an adhesive sheet having a layered structure of PET film/adhesive layer/PET film. In the step of treating the adhesive composition solution layer at 100° C. for 1 minute, a reaction of cross-linking polyester resin A with the cross-linking agent also occurs. In contrast to Manufacturing Example 2, a treatment step at 40° C. for 3 days (aging step) is not performed after the drying step in Manufacturing Example 4. However, the adhesive composition solution of Manufacturing Example 4 contains about 5 times as much cross-linking catalyst as in the adhesive composition solution of Manufacturing Example 2; therefore, a reaction of cross-linking polyester resin A with the cross-linking agent occurs in the step of treating the adhesive composition solution layer of Manufacturing Example 4 at 100° C. for 1 minute.

Manufacturing Example 5

Production of Acrylic Adhesive Sheet (1) Preparation of Adhesive Composition Solution First, an acrylic polymer was prepared. By using a four-necked flask equipped with stirring blades, a thermometer, a nitrogen gas inlet tube, and a condenser, 90.7 mass parts of n-butyl acrylate (BA), 6.3 mass parts of 4-acryloyl morpholine (ACMO), 2.7 mass parts of acrylic acid (AA), 0.3 mass parts of 4-hydroxybutyl acrylate (4HBA), and 0.1 mass parts of 2,2'-azobisisobutyronitrile as a polymerization initiator were placed in the flask together with ethyl acetate, so that the total of monomers was 50 mass %. After nitrogen replacement for 1 hour by introducing nitrogen gas with gentle stirring, the liquid temperature in the flask was kept at around 58° C. and the polymerization reaction was carried out for 8 hours, whereby an acrylic polymer was obtained. After 2 hours had elapsed from the start of the polymerization reaction, ethyl acetate was added dropwise over 3 hours to bring the solid content to 35 mass %. In other words, the acrylic polymer was obtained as an acrylic polymer solution with a solid content of 35 mass %.

Next, in the resultant acrylic polymer solution, 0.15 mass parts of trimethylolpropane/tolylene diisocyanate trimer adduct (manufactured by Tosoh Corporation, product name: Coronate L) and 0.075 mass parts of dibenzoyl peroxide (manufactured by Nippon Oil & Fats Co., Ltd.: NYPER BMT40 (SV)) as cross-linking agents were blended with respect to 100 mass parts of the polymer, thereby preparing an adhesive composition solution.

(2) Production of Adhesive Sheet

On one side of a polyethylene terephthalate (PET) film (product name: "MRF38", manufactured by Mitsubishi Chemical Corporation) having a thickness of 38 μm and having been silicone release-treated, an adhesive composition solution was applied to form an adhesive composition solution layer. The application was performed so that the adhesive composition solution layer had a thickness after drying (i.e., thickness of the adhesive composition layer) of 5 μm. By drying the adhesive composition solution layer at 150° C. for 3 minutes, the solvent in the adhesive composition solution layer was removed, and the acrylic polymer was cross-linked by the cross-linking agent, whereby an adhesive composition layer was obtained. Next, the adhesive composition layer was attached onto a release-treated surface of a polyethylene terephthalate (PET) film (product name: "MRE38", manufactured by Mitsubishi Chemical Corporation) having a thickness of 38 μm and having been silicone release-treated, thereby producing an adhesive sheet having a layered structure of PET film/adhesive composition layer/PET film.

Manufacturing Example 6

(1) Preparation of Polyester Resin A

This was performed similarly to Manufacturing Example 2.

(2) Preparation of Adhesive Composition Solution

To 100 mass parts in solid content of the polyester resin A solution prepared as above, 0.07 mass parts of zirconium tetraacetylacetonate (product name "Orgatix ZC-162", manufactured by Matsumoto Fine Chemical Co., Ltd.; "Orgatix" is a registered trademark; hereinafter may be referred to as "ZC-162") as a cross-linking catalyst, 12 mass parts of isocyanurate of hexamethylene diisocyanate (product name "Coronate HX", manufactured by Tosoh Corporation; "Coronate" is a registered trademark; hereinafter may be referred to as "Coronate HX") as a cross-linking agent, and 20 mass parts of acetylacetone as a catalytic reaction inhibitor were blended; to this, ethyl acetate was further added to result in a solid concentration of 20 mass %, thus preparing an adhesive composition solution.

(3) Production of Adhesive Sheet

On one side of a polyethylene terephthalate (PET) film (product name: "MRF38", manufactured by Mitsubishi Chemical Corporation) having a thickness of 38 μm and having been silicone release-treated, the adhesive composition solution was applied to form an adhesive composition solution layer. The application of the adhesive composition solution layer was performed so that the adhesive layer had a thickness of 7 μm after drying. By drying the adhesive composition solution layer at 100° C. for 3 minutes, the solvent in the adhesive composition solution layer was removed, whereby an adhesive layer was obtained. Next, the adhesive composition layer was attached onto a release-treated surface of a 38 μm polyethylene terephthalate (PET) film (product name: "MRE38", manufactured by Mitsubishi Chemical Corporation) having been silicone release-treated. In this manner, an adhesive sheet (multilayered body) having a layered structure of PET film/adhesive layer/PET film was produced.

Example 1

From the adhesive sheet obtained in Manufacturing Example 2, one of the release-treated PET films was peeled off, and the exposed adhesive layer surface was attached onto an acrylic resin film (thickness: 30 μm), and the other separator (PET film) was further peeled off. This was attached to the concavo-convex textured film of Manufacturing Example 1, and subjected to an autoclave treatment at 50° C. and 0.5 MPa for 15 minutes, whereby an optical stack having a layered structure of acrylic resin film/adhesive layer/concavo-convex textured film was obtained.

Example 2

From the adhesive sheet obtained in Manufacturing Example 3, one of the release-treated PET films was peeled off, and the exposed adhesive composition layer was attached onto an acrylic resin film (thickness: 20 μm), and the other separator (PET film) was further peeled off. This was attached to the concavo-convex textured film of Manufacturing Example 1 with a pressure of 0.03 MPa, whereby a multilayered body having a layered structure of acrylic resin film/adhesive composition layer/concavo-convex textured film was obtained.

Next, this multilayered body was irradiated with ultraviolet through the acrylic resin film to cure the UV-curable resin in the adhesive composition layer, whereby an optical stack having a layered structure of acrylic resin film/adhesive layer/concavo-convex textured film was obtained. Ultraviolet irradiation was performed with an LED lamp (manufactured by Quark Technology Inc., peak illuminance: 200 mW/cm$^2$, cumulative light amount: 500 mJ/cm$^2$ (wavelength: 345 to 365 nm)), where the ultraviolet illuminance was measured by using a UV Power Puck (manufactured by Fusion UV Systems Japan, Inc.).

Example 3

From the adhesive sheet obtained in Manufacturing Example 4, one of the release-treated PET films was peeled off, and the exposed adhesive composition layer was attached onto an acrylic resin film (thickness: 30 μm), and the other separator (PET film) was further peeled off. This was attached to the concavo-convex textured film of Manufacturing Example 1, and subjected to an autoclave treatment at 50° C. and 0.5 MPa for 15 minutes, whereby an optical stack having a layered structure of acrylic resin film/adhesive layer/concavo-convex textured film was obtained.

Comparative Example 1

From the adhesive sheet obtained in Manufacturing Example 5, one of the release-treated PET films was peeled off, and the exposed adhesive composition layer was attached onto an acrylic resin film (thickness: 20 μm), and the other separator (PET film) was further peeled off. This was attached to the concavo-convex textured film of Manufacturing Example 1 with a pressure of 0.05 MPa, whereby an optical stack having a layered structure of acrylic resin film/adhesive composition layer/concavo-convex textured film was obtained.

Comparative Example 2

From the adhesive sheet obtained in Manufacturing Example 6, one of the release-treated PET films was peeled off, and the exposed adhesive composition layer was attached onto an acrylic resin film (thickness: 30 μm), and the other separator (PET film) was further peeled off. This was attached to the concavo-convex textured film of Manufacturing Example 1, and subjected to an autoclave treatment at 50° C. and 0.5 MPa for 15 minutes, whereby an optical stack having a layered structure of acrylic resin film/adhesive layer/concavo-convex textured film was obtained.

Evaluation Items

<Light Distribution Characteristics>

Figure 7:
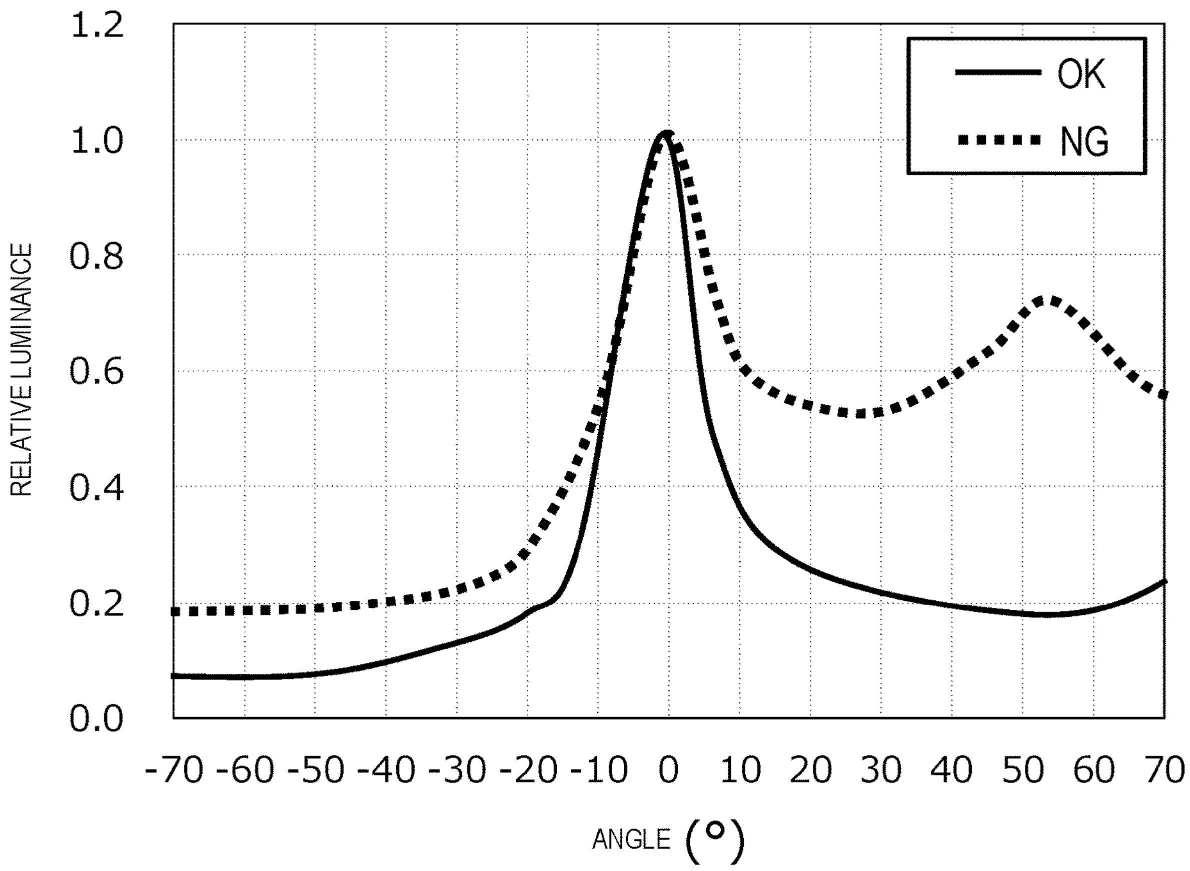
FIG. 7 A diagram showing typical examples of results of measuring light distribution characteristics of an illumination device incorporating an optical stack.

The optical stack having a layered structure of acrylic resin film/adhesive layer/concavo-convex textured film was stacked on an acrylic panel having a thickness of 2 mm via a layer of tackiness agent, this being used as an evaluation sample. The concavo-convex textured film in the optical stack and the acrylic panel were attached together via the layer of tackiness agent. As in the illumination device 200B of FIG. 4B, a white LED (light source) was placed so as to emit light toward a side surface of the acrylic panel (light-guide layer), in such a manner that the first slope of each dent in the concavo-convex textured film having the smaller inclination angle $\theta a$ was closer to the light source (white LED) than the second slope having the greater inclination angle $\theta b$. By using a conoscope (manufactured by Radiant, Conoscope 070, all azimuth angles, polar angle −70° to 70°), a frontal luminance of light that is transmitted through the aforementioned evaluation sample was measured (unit: cd/m$^2$). FIG. 7 schematically shows typical examples of measurement results. Based on the obtained results, light distribution characteristics of the illumination device including the optical stack was evaluated according to the following criteria.

○ (OK): Given the luminance of a main peak being defined as 100%, luminance at the polar angle of the main peak plus 10° or more is less than 65% x (NG): Given the luminance of a main peak being defined as 100%, 65% or more luminance exists at the polar angle of the main peak plus 10° or more In the NG example of FIG. 7, not only at the main peak (i.e., a peak that has a maximum value of luminance within polar angles −10° to 10°), but also at polar angles larger than the main peak, a peak of relatively large luminance (65% or more of the main peak luminance) exists. In the OK example of FIG. 7, no significant peak exists at polar angles larger than the main peak (i.e., a peak that has a maximum value of luminance within polar angles −10° to 10°). For example, the luminance at polar angles that are the main peak plus 20° or more is kept at 30% or less of the main peak luminance. It can be said that the OK example provides better light distribution control than does the NG example.

<Evaluation of Haze Value>

By using a haze meter (machine name: “HZ-1”, manufactured by Suga Testing Machinery Co.), the haze value of the resultant adhesive sheet was measured with D65 light. The measurement was taken by sandwiching the adhesive sheet between an acrylic resin film having a thickness of 30 μm and a cycloolefin film having a thickness of 60 μm, with the cycloolefin film being placed at the light source side.

<Evaluation of Gel Fraction>

From the adhesive layer of the adhesive sheet of each of Examples 1 to 3 and Comparative Examples 1-2 (in the case of Example 2, the adhesive sheet having an adhesive layer after curing the curable resin), about 0.1 g of the adhesive composition (before curing the curable resin) was taken. This was wrapped in a porous tetrafluoroethylene sheet (product name: “NTF1122”, manufactured by Nitto Denko Corporation) having an average pore diameter 0.2 μm, and thereafter tied with a kite string (referred to as “Test Sample A1”). The mass of this was measured (defined as mass before immersion (W2)). The mass before immersion (W2) is an overall mass including the adhesive composition, the porous tetrafluoroethylene sheet, and the kite string. The total mass of the porous tetrafluoroethylene sheet and the kite string was also separately measured (defined as tare mass (W1)).

Next, Test Sample A1 was placed in a 50 mL container filled with ethyl acetate, and left at 23° C. for 7 days. Thereafter, Test Sample A1 (after ethyl acetate treatment) was taken out of the container, placed in an aluminum cup, and was dried at 130° C. for 2 hours in a dryer to remove ethyl acetate, after which the mass of Test Sample A1 was measured (defined as mass after immersion (W3)). A gel fraction was calculated from the following equation.

$$\text{gel fraction (\% (mass \%))}=(W3-W1)\times 100/(W2-W1)$$

<Evaluation of Initial Tensile Modulus of Elasticity of Adhesive Composition>

From the adhesive sheet of each of Examples 1 and 3 and Comparative Example 1 and 2, a test piece sized 30 mm wide and 60 mm long was cut out; one of the release-treated PET films was peeled off; and the exposed adhesive layer was rounded into a cylindrical shape with a diameter of about 0.6 mm, thus producing a sample for measurement.

In a measurement environment at 23° C. and 65% RH, the aforementioned cylindrical-shaped sample for measurement was set in a tensile/compression tester (machine name: "AGS-50NX", manufactured by Shimadzu Corporation). Under the conditions that the chuck interval was 10 mm and the drawing rate was 50 mm/minute, the amount of change (mm) responsive to an elongation along the axial direction of the above cylinder was measured. In an S-S (Strain-Strength) curve obtained from this, an initial tensile modulus of elasticity $E_0$ of the adhesive composition was defined as $E_0=(\sigma_2-\sigma_1)/(\varepsilon_2-\varepsilon_1)$, where σ1 and σ2 were the tensile stresses corresponding to respective tensile strains at two points ($\varepsilon_1$=5% and $\varepsilon_2$=10%). Herein, the tensile strain a was calculated based on the chuck interval.

$\varepsilon=(L_1-L_0)/L_0$ or $\varepsilon(\%)=100\times(L_1-L_0)/L_0$

ε: tensile strain (dimensionless ratio or %)

$L_0$: initial chuck interval (mm)

$L_1$: chuck interval after elongation (mm)

the tensile stress σ is calculated based on a cross-sectional area of the test piece before elongation.

$\sigma=F/A$

σ: tensile stress (MPa)

F: measuring load (N)

A: cross-sectional area of test piece before elongation ($mm^2$)

For Example 2, an initial tensile modulus of elasticity of the adhesive curing its curable resin by ultraviolet irradiation was evaluated. From the adhesive sheet, a test piece sized 20 mm wide and 60 mm long was cut out, thus producing a sample for measurement. Its amount of change (mm) responsive to an elongation along the longitudinal direction was measured, and an initial tensile modulus of elasticity was found.

TABLE 1

| | | Ex. 1 | Ex. 2 | Ex. 3 | Comp. Ex. 1 | Comp. Ex. 2 |
|---|---|---|---|---|---|---|
| polymer | type | polyester resin A | acrylic polymer + UV-curable resin | polyester resin A | acrylic polymer | polyester resin A |
| | mass parts | 100 | 100 | 100 | 100 | 100 |
| cross-linking agent | type | Coronate HX | TETRAD-C | Coronate HX | Coronate L/NYPER BMT40 (SV) | Coronate HX |
| | mass parts | 12 | 0.6 | 12 | 0.15/0.075 | 12 |
| cross-linking catalyst | type | Zr catalyst (ZC-162) | — | Zr catalyst (ZC-162) | — | Zr catalyst (ZC-162) |
| | mass parts | 0.07 | — | 0.33 | — | 0.07 |
| photo-polymerization initiator | type | — | Omnirad 2959 | — | — | — |
| | mass parts | — | 1 | — | — | — |
| adhesive sheet producing conditions | drying condition | 150° C. 1 min | 140° C. 3 min | 100° C. 1 min | 150° C. 3 min | 100° C. 3 min |
| | aging | 40° C., 3 days | — | NO | — | NO |
| | UV irradiation | — | 500 mJ/cm$^2$ | — | — | — |
| thickness of adhesive layer [μm] | | 7 | 7 | 7 | 5 | 5 |
| pressing condition for adhesive layer and optical sheet | | 50° C., 0.5 MPa, 15 min | 0.03 MPa | 50° C., 0.5 MPa, 15 min | 0.05 MPa | 50° C., 0.5 MPa, 15 min |

TABLE 2

| | Ex. 1 | Ex. 2 | Ex. 3 | Comp. Ex. 1 | Comp. Ex. 2 |
|---|---|---|---|---|---|
| A [μm] | 0.4 | 1 | 1.9 | 2.7 | 8.5 |
| B [μm] | 0 | 0 | 0 | 1 | 8.5 |
| C [μm] | 10 | 10 | 9.4 | 7.4 | 8.5 |
| (C − A)/C | 0.96 | 0.9 | 0.8 | 0.64 | 0 |
| (C − A)/(C − B) | 0.96 | 0.9 | 0.8 | 0.73 | — |
| light distribution characteristics | ○ | ○ | ○ | x | x |
| haze [%] | 0.5 | 0.4 | 0.4 | 0.4 | 0.4 |
| gel fraction [%] | 96.3 | 97 | 81.5 | 97 | 36.4 |
| initial tensile modulus of elasticity [MPa] | 2.34 | 2.8 | 1.4 | 0.19 | 0.53 |

The maximum height value A of the adhesive layer in the dent, the minimum height value B of the adhesive layer in the dent, and the depth C of the dent were determined by measuring length from a cross-sectional image of the optical stack. Measurements were respectively taken from cross-sectional images of multiple places that were arbitrarily chosen, and mean values thereof were determined. The reason for variation in the depth C of the dent from sample to sample is that it may differ depending on where the cross-section is taken (how it is taken).

The optical stacks of Examples 1 to 3 all satisfy formula (I) and formula (II). Illumination devices incorporating the optical stack Examples 1 to 3 have good light distribution control. On the other hand, the optical stacks according to Comparative Examples 1 and 2 do not satisfy formula (I) and formula (II). Illumination devices incorporating the optical stacks of Comparative Examples 1 and 2 are inferior to Examples 1 to 3 from the standpoint of light distribution control.

The adhesive layer in the optical stack of Comparative Example 2 significantly differs from the adhesive layer in the optical stack of Example 1 in that it is formed without performing a treatment step at 40° C. for 3 days (aging step) after the step of removing the solvent in the adhesive composition solution layer (drying step). The type and amount of cross-linking catalyst are identical between Comparative Example 2 and Example 1. In Example 1, the cross-linking reaction of polyester resin A may partially occur also in the drying step, but a large part of the cross-linking reaction of polyester resin A occurs in the treatment step at 40° C. for 3 days. In Comparative Example 2, because a treatment step at 40° C. for 3 days was not performed, so that sufficient cross-linking reaction of polyester resin A did not occur, for which reason presumably the penetration of the resultant adhesive layer into the dents of the concavo-convex structure of the optical sheet was not sufficiently reduced. In the adhesive layer of Comparative Example 2, the gel fraction is also as low as less than 40%.

In Example 3, too, a treatment step at 40° C. for 3 days (aging step) was not performed after the drying step. However, the adhesive composition solution used in Example 3 contains about 5 times as much cross-linking catalyst as in the adhesive composition solution used in Example 1; therefore, in Example 3, a reaction of cross-linking polyester resin A with the cross-linking agent occurs in the step of treating the adhesive composition solution layer at 100° C. for 1 minute, for which reason presumably the penetration of the resultant adhesive layer into the dents of the concavo-convex structure of the optical sheet was reduced.

In the case where an adhesive layer which is formed by cross-linking an adhesive composition containing: a polyester resin that is a copolymer of a polycarboxylic acid and a polyalcohol; a cross-linking agent; and at least one cross-linking catalyst selected from the group consisting of an organic zirconium compound, organic iron compound, and an organic aluminum compound is used as the adhesive layer, 0.01 mass parts or more of a cross-linking catalyst is preferably contained with respect to 100 mass parts of a polyester resin, for example. The step of cross-linking the adhesive composition preferably includes a step of treating it at a temperature not lower than 25° C. and not higher than 80° C. for one day or more (aging step). However, as the adhesive layer, that which is produced without performing an aging step may also be used. An adhesive layer that is produced without performing an aging step is preferably made of an adhesive composition that contains e.g. 0.2 mass parts or more of a cross-linking catalyst with respect to 100 mass parts of a polyester resin.

The adhesive layer in the optical stack of Comparative Example 1 significantly differs from the adhesive layer in the optical stack of Example 2 in that no cured material of a UV-curable resin is contained. It can be seen that, in the case where the adhesive layer is produced by using an acrylic polymer, preferably some cured material of a UV-curable resin is contained. However, without being limited thereto, by adjusting the composition of the acrylic polymer, etc., for example, penetration into the dents of the concavo-convex structure of the optical sheet can be reduced even in the case of an adhesive layer that does not contain any cured material of a UV-curable resin.

INDUSTRIAL APPLICABILITY

Optical stacks according to the present invention can be broadly used in optical devices, such as display devices or illumination devices.

REFERENCE SIGNS LIST

10*a* first optical sheet
12*s*, 18*s* principal face (surface)
20*a*, 20*b* adhesive layer
60 light source
80 lightguide layer
100A, 100B1, 100B2, 100B3, 101A, 102A optical stack
200A, 200B illumination device

The invention claimed is:

1. An optical stack comprising:

a first optical sheet having a first principal face with a concavo-convex structure and a second principal face at an opposite side from the first principal face; and an adhesive layer that is disposed on the first principal face of the first optical sheet, wherein the adhesive layer does not contain a graft polymer, wherein, the concavo-convex structure includes a plurality of dents and flat portions between adjacent ones of the plurality of dents;

the adhesive layer is in contact with the flat portions;

a surface of the adhesive layer and the first principal face of the first optical sheet together define an internal space within each of the plurality of dents; and each of the plurality of dents satisfies $0.10 \leq (C-A)/C \leq 1.00$ and $0.75 \leq (C-A)/(C-B)$, where A is a maximum height value of the adhesive layer existing in that dent; B is a minimum height value of the adhesive layer existing in that dent; and C is a depth of that dent.

2. The optical stack of claim 1, wherein a thickness of the adhesive layer above the flat portions is not less than 0.01 μm and not more than 15.0 μm.

3. The optical stack of claim 1, wherein, in a plan view in which the first optical sheet is viewed from a normal direction of the first principal face, a ratio of an area of the plurality of dents to an area of the first optical sheet is not less than 0.3% and not more than 80%.

4. The optical stack of claim 1, wherein the plurality of dents have a cross-section which is a triangle, a rectangle, or a shape that at least partially contains a curve.

5. The optical stack of claim 1, having a haze value of 5.0% or less.

6. The optical stack of claim 1, wherein the adhesive layer is any one of adhesive layers Aa, Ab and Ac as follows:

an adhesive layer Aa, having a creep deformation rate of 10% or less when a stress of 10000 Pa is applied for 1 second at 50° C. and a creep deformation rate of 16% or less when a stress of 10000 Pa is applied for 30 minutes at 50° C. in a creep test using a rotational rheometer, the adhesive layer Aa having a 180° peel adhesive strength of 10 mN/20 mm or more with respect to a PMMA film;

an adhesive layer Ab, being formed by curing a curable resin in an adhesive composition that includes a polymer and the curable resin, the adhesive layer Ab having a 23° C. initial tensile modulus of elasticity of not less than 0.35 MPa and not more than 8.00 MPa before curing the curable resin in the adhesive composition and having a 23° C. initial tensile modulus of elasticity of 1.00 MPa or more after curing the curable resin in the adhesive composition; and an adhesive layer Ac, being formed by cross-linking an adhesive composition containing: a polyester resin that is a copolymer of a polycarboxylic acid and a polyalcohol; a cross-linking agent; and at least one cross-linking catalyst selected from the group consisting of an organic zirconium compound, organic iron compound, and an organic aluminum compound, the adhesive layer Ac having a gel fraction of 40% or more after being maintained at a temperature of 85° C. and a relative humidity of 85% for 300 hours and having a 180° peel adhesive strength of 100 mN/20 mm or more with respect to a PMMA film.

7. The optical stack of claim 1, wherein the adhesive layer contains at least one of polymers (1) to (3) as follows:

(1) a copolymer of a nitrogen-containing (meth)acrylic monomer and at least one other kind of monomer;

(2) a copolymer of a carboxyl group-containing acrylic monomer and at least one other kind of monomer (except for nitrogen-containing (meth)acrylic monomers); and (3) a polyester-based polymer.

8. The optical stack of claim 1, further comprising a second optical sheet provided at an opposite side of the adhesive layer from the first optical sheet.

9. The optical stack of claim 1, wherein, each of the plurality of dents includes a first slope to direct a portion of light propagating in the adhesive layer toward the second principal face of the first optical sheet via total internal reflection, and a second slope at an opposite side from the first slope; and in each of the plurality of dents, a height of the adhesive layer above the first slope of that dent is the maximum height value of the adhesive layer existing in that dent.

10. The optical stack of claim 9, wherein an inclination angle θa of the first slope is smaller than an inclination angle θb of the second slope.

11. An optical device comprising the optical stack of claim 1.

* * * * *